United States Patent
Teo et al.

(10) Patent No.: US 8,934,276 B2
(45) Date of Patent: Jan. 13, 2015

(54) DC-LINK VOLTAGE BALANCING CONTROL FOR MULTILEVEL INVERTERS

(75) Inventors: Koon Hoo Teo, Lexington, MA (US); Yi Deng, Atlanta, GA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 152 days.

(21) Appl. No.: 13/587,814

(22) Filed: Aug. 16, 2012

(65) Prior Publication Data

US 2014/0050000 A1   Feb. 20, 2014

(51) Int. Cl.
*H02M 7/48* (2006.01)
*H02M 7/483* (2007.01)

(52) U.S. Cl.
USPC ............................................. 363/131; 363/97

(58) Field of Classification Search
USPC ................................. 363/35, 97, 98, 131, 132
See application file for complete search history.

(56) References Cited

U.S. PATENT DOCUMENTS 5,598,326 A * 1/1997 Liu et al. .......................... 363/34
8,441,820 B2 * 5/2013 Shen et al. .................. 363/56.01

* cited by examiner

*Primary Examiner* — Gary L Laxton
(74) *Attorney, Agent, or Firm* — Dirk Brinkman; Gene Vinokur

(57) ABSTRACT

A method for balancing a voltage of an inverter determines an expected voltage of a capacitor based on a voltage of the capacitor at a start of a switching cycle and determines a duty cycle minimizing a value of an objective function representing a difference between the expected voltage of the capacitor and a desired voltage of the capacitor. A switching sequence controlling the inverter is selected based on the duty cycle.

17 Claims, 30 Drawing Sheets

| Switching State of Each Phase | Corresponding Status of the Switches | | | | | | | |
|---|---|---|---|---|---|---|---|---|
| | $S_1$ | $S_2$ | $S_3$ | $S_4$ | $S_1'$ | $S_2'$ | $S_3'$ | $S_4'$ |
| 4 | 1 | 1 | 1 | 1 | 0 | 0 | 0 | 0 |
| 3 | 0 | 1 | 1 | 1 | 1 | 0 | 0 | 0 |
| 2 | 0 | 0 | 1 | 1 | 1 | 1 | 0 | 0 |
| 1 | 0 | 0 | 0 | 1 | 1 | 1 | 1 | 0 |
| 0 | 0 | 0 | 0 | 0 | 1 | 1 | 1 | 1 |

FIG. 2C

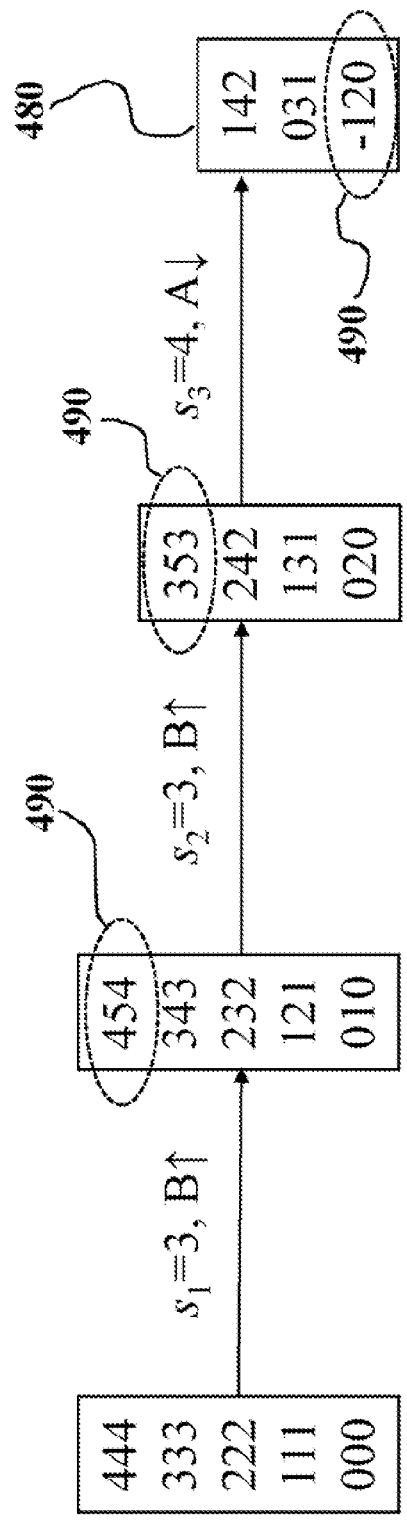

|  | reg | | | | | |
|---|---|---|---|---|---|---|
|  | 1 | 2 | 3 | 4 | 5 | 6 |
| mode=1 | ABC↑(L) | CAB↓(U) | BCA↑(L) | ABC↓(U) | CAB↑(L) | BCA↓(U) |
| mode=2 | CBA↓(U) | BAC↑(L) | ACB↓(U) | CBA↑(L) | BAC↓(U) | ACB↑(L) |

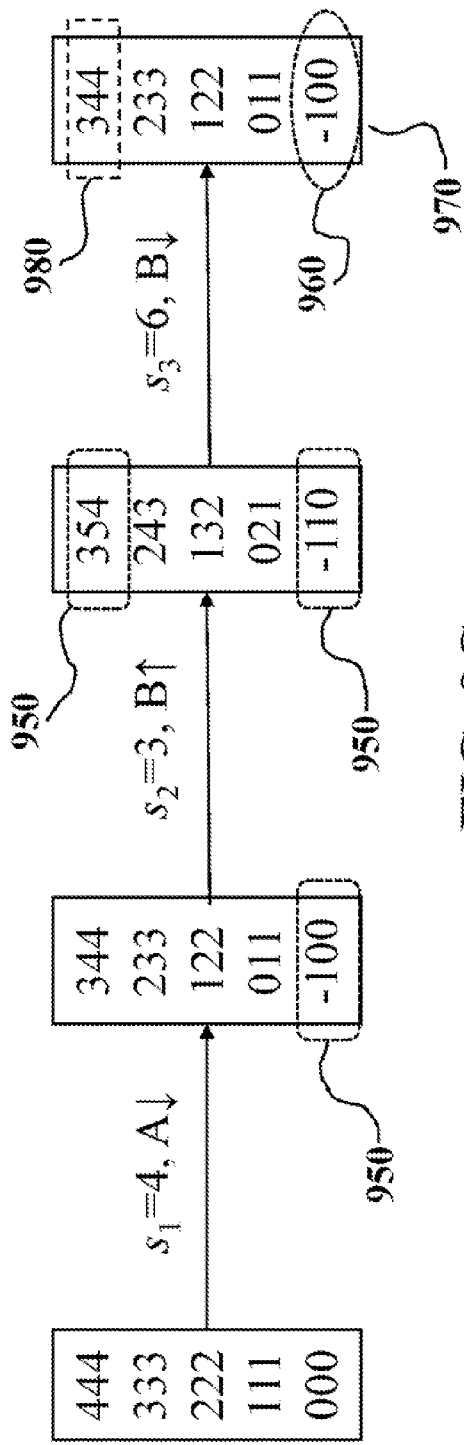
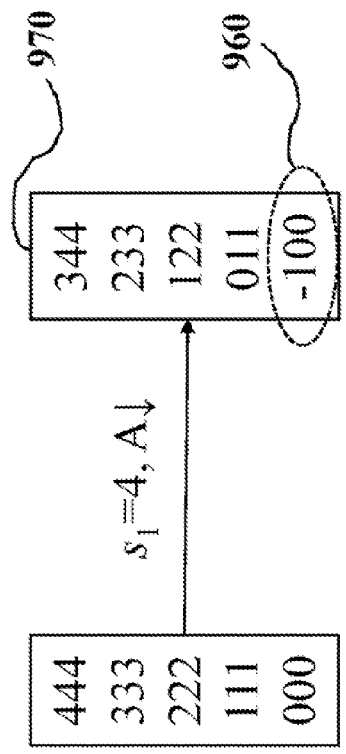
FIG. 9C
FIG. 9D

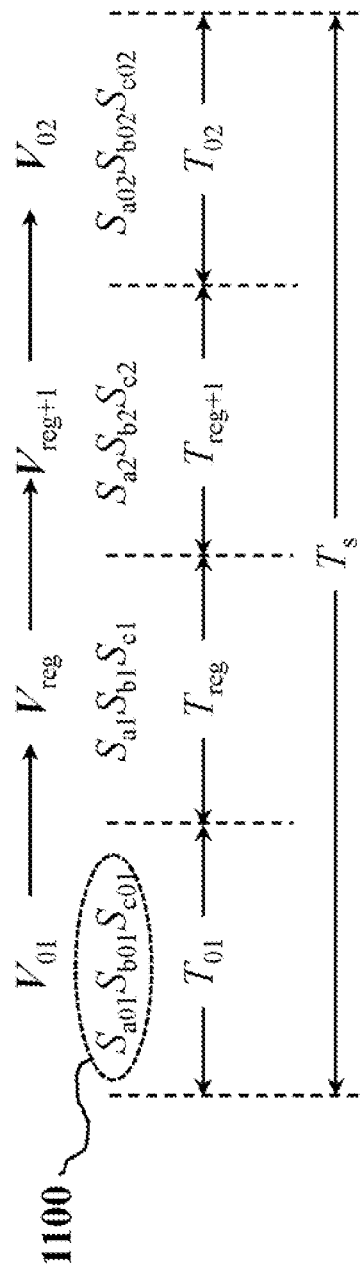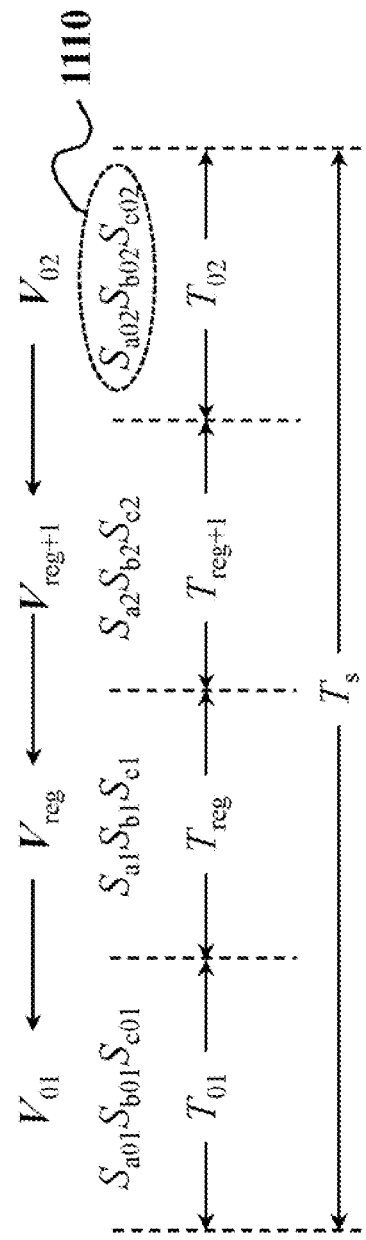
FIG. 11C
FIG. 11D

|  | reg | | | | | |
|---|---|---|---|---|---|---|
|  | 1 | 2 | 3 | 4 | 5 | 6 |
| mode=1 | ABC↑CBA↓(L) | CAB↓BAC↑(U) | BCA↑ACB↓(L) | ABC↓CBA↑(U) | CAB↑BAC↓(L) | BCA↓ACB↑(U) |
| mode=2 | CBA↓ABC↑(U) | BAC↑CAB↓(L) | ACB↓BCA↑(U) | CBA↑ABC↓(L) | BAC↓CAB↑(U) | ACB↑BCA↓(L) |

FIG. 13A

| mode=1 | 022→023→123→133→123→023→022 |
|---|---|
|  | 133→134→234→244→234→134→133 |
| mode=2 | 244→234→134→133→134→234→244 |
|  | 133→123→023→022→023→123→133 |

FIG. 13B

$$v_i(k+1) = \underbrace{w \cdot v_i(k)}_{1810} + \underbrace{c_1\phi_1 \cdot (x_{i,pbest}(k) - x_i(k))}_{1820} + \underbrace{c_2\phi_2 \cdot (x_{gbest}(k) - x_i(k))}_{1830}$$

DC-LINK VOLTAGE BALANCING CONTROL FOR MULTILEVEL INVERTERS

RELATED APPLICATIONS

This application is copending with of U.S. patent application Ser. No. 13/547,562 entitled "Space Vector Modulation for Multilevel Inverters" filed by Deng et al. on Jul. 12, 2012, and incorporated herein by reference.

FIELD OF THE INVENTION

This invention relates generally to electrical power conversion systems, and more particularly to DC-link voltage balancing control for a multilevel inverter.

BACKGROUND OF THE INVENTION

Multilevel inverters are widely used in high-power high-voltage applications due to advantageous performance over two-level inverters, including reduced voltage pressure or tension on the power devices, lower harmonics, lower instantaneous rate of voltage change (dv/dt), and lower common-mode voltage. However, the inherent voltage drift of the DC-link capacitors of the multilevel inverters will degrade the performance of the multilevel inverters, in terms of higher voltage pressure on the power devices, higher harmonics, higher electromagnetic interference, and so on. If the voltage drift of the DC-link capacitors is not limited during the operation of the multilevel inverter, then the unbalances of DC-link capacitor voltages even lead to the collapse of some of these voltages under a wide range of operating conditions.

Several approaches have been suggested to balance the DC-link capacitor voltages of the multilevel inverters. One approach is realized by introducing extra circuits to keep the DC-link voltages balanced such as by A. Jouanne, et al., "A multilevel inverter approach providing DC-link balancing, ride-through enhancement, and common-mode voltage elimination," IEEE Trans. Ind. Electron., vol. 49, no. 4, pp. 739-745, August 2002. However, A. Jouanne's method requires additional power hardware, which adds to the cost and complexity of the system. In another approach, the DC-link voltage balancing is achieved with the help of another active power circuit which is already part of the system as by A. Yazdani, et al., "Dynamic model and control of the NPC based back-to-back HVDC system," IEEE Trans. Power Delivery, vol. 21, no. 1, pp. 414-424, January 2006. However, A. Yazdani's method is proper for a double converter back-to-back application, but not suitable for a stand-alone multilevel inverter.

The third approach for DC-link voltage balancing control for multilevel inverters is to modify the switching pattern of the inverter according to a control strategy to balance the DC-link capacitor voltages, which attracts more and more attention nowadays because no additional hardware is needed. Space vector pulse width modulation, also called SVPWM, is the most attractive modulation strategy for multilevel inverters because SVPWM provides significant flexibility for optimizing switching waveforms, and because SVPWM is well suitable for digital signal processor implementation. One virtual-space-vector pulse width modulation based DC-link voltage balancing control method is introduced by S. Busquets, et al., "Pulsewidth Modulations for the Comprehensive Capacitor Voltage Balance of n-Level Three-Leg Diode Clamped Converters, IEEE Trans. Power Electron., vol. 24, no. 5, pp. 1364-1375, 2009. In S. Busquets's method, however, the addition of the three phase currents is required to be zero, which limits the application of the method, and the complexity of the method will be increased dramatically with the increase of the inverter level. Some other SVPWM DC-link voltage balancing schemes based on objective function optimization can be found in M. Saeedifard, et al., "Analysis and Control of DC-Capacitor-Voltage-Drift Phenomenon of a Passive Front-End Five-Level Converter", IEEE Trans. Ind. Electron., vol. 54, no. 6, pp. 3255-3266, 2007; and L. Su, et al., "A Novel DC Voltage Balancing Scheme of Five-Level Converters Based on Reference-Decomposition SVPWM," Applied Power Electronics Conference and Exposition, pp. 1597-1603, Orlando, February 2012. In both M. Saeedifard's and L. Su's methods, the addition of the instantaneous currents of the DC-link capacitors are assumed to be zero, which is not accurate when the voltage of the DC source has fluctuation or the capacitances of the DC-link capacitors are not strictly equal. Moreover, the duty cycles of the space vectors are fixed in M. Saeedifard's and L. Su's methods, which can't provide the best control effect for all operation conditions. In addition, in M. Saeedifard's method, the objective function needs to be differentiable, which makes M. Saeedifard's method ineffective when non-differentiable objective functions are adopted.

Accordingly, there is a need for general DC-link voltage balancing method for multilevel inverters.

SUMMARY OF THE INVENTION

It is an object of some embodiments of an invention to provide a method for a DC-link voltage balancing control of an inverter, e.g., a multilevel inverter. It is further object of some embodiments to control the fluctuation of the voltages of the DC-link capacitors of the inverter in real time. It is further object of some embodiments of the invention to control the voltages of the DC-link capacitors such that a difference between desired and expected voltages of the capacitors is minimized. It is further object of some embodiments of the invention to provide various approaches to control the voltages in a computationally efficient manner.

The desired voltage of a DC-link capacitor can be the preferred or needed voltage of the DC-link capacitor. An example of the desired voltage is $V_{dc}/(n-1)$, where $V_{dc}$ is the voltage of the DC source of the inverter and n is the level of the inverter. The expected voltage of a DC-link capacitor can be the voltage of the DC-link capacitor determined for a switching cycle. In some embodiments of the invention, the expected voltage of a DC-link capacitor is the voltage predicted for the DC-link capacitor at a start of a switching cycle.

Some embodiments of the invention are based on a realization that voltages of the DC-link capacitors powering a multilevel inverter from a DC source can be controlled by adjusting duty cycles of the inverter. For example, it was realized that the voltages of the DC-link capacitors can be controlled by controlling the currents of the DC-link capacitors. The currents of the DC-link capacitors can be controlled by the input currents of the inverter, and the input currents of the inverter are determined by the output currents and switching states of the inverter. Accordingly, this realization allows controlling the voltages of the DC-link capacitors by selecting the switching sequence and adjusting the duty cycles.

The time period of the switching cycle of the inverter is fixed and is an inverse of the command switching frequency of the inverter. The switching cycle includes a set of duty cycles corresponding to various switching states of the inverter. The sum of the duty cycles must be equal to the switching cycle, but the values of the specific duty cycles can vary, and is used to control the voltages of the capacitors.

Some embodiments of the invention balance the voltage of the inverter by minimizing an objective function of a duty cycle for a switching cycle. The objective function includes a difference between a desired voltage of a capacitor and an expected voltage of the capacitor for the switching cycle.

Accordingly, one embodiment discloses a method for balancing a voltage of an inverter determines an expected voltage of a capacitor based on a voltage of the capacitor at a start of a switching cycle and determines a duty cycle minimizing a value of an objective function representing a difference between the expected voltage of the capacitor and a desired voltage of the capacitor. A switching sequence controlling the inverter is selected based on the duty cycle.

Another embodiment discloses a method for a DC-link voltage balancing of a multilevel inverter based on an objective function of a duty cycle representing a difference between a desired voltage of a capacitor and an expected voltage of the capacitor. The method includes determining a set of switching sequences based on a reference voltage; minimizing, for each switching sequence in the set of switching sequences, an objective function to produce a set of duty cycles; and selecting the switching sequence and the duty cycle corresponding to a minimal value of the objective function.

Yet another embodiment discloses a voltage balancing controller, comprising a processor determining a duty cycle minimizing an objective function representing a difference between an expected and a desired voltage of a capacitor, and controlling an inverter based on a switching sequence corresponding to the duty cycle.

BRIEF DESCRIPTION OF THE DRAWINGS

FIGS. 2A-2C are a circuit diagram of single phase circuit topology, space vector diagram, and a table of switching states of a three-phase five-level neutral point clamped inverter, respectively that use embodiments of the invention;

FIG. 4A is a schematic of calculation method of locating the reference vector of the invention according to some embodiments of the invention;

FIG. 4B is a schematic of illustration of applying the calculation method shown in FIG. 4A to locating the reference vector illustrated in FIG. 3A according to some embodiments of the invention;

FIG. 9C is a schematic of locating the reference vector illustrated in FIG. 9A based on the calculation method of locating the reference vector shown in FIG. 4A according to some embodiments of the invention;

FIG. 9D is a schematic of locating the reference vector illustrated in FIG. 9B based on the calculation method of locating the reference vector shown in FIG. 4A according to some embodiments of the invention;

FIG. 11C-11D are two modes of switching sequences according to some embodiments of the invention;

FIG. 13A is the switching sequence selection method when symmetric switching sequence is required according to some embodiments of the invention;

FIG. 13B is an illustration of applying the switching sequence selection method shown in FIG. 13A to generate the switching sequence of the reference vector illustrated in FIG. 12A according to some embodiments of the invention;

DETAILED DESCRIPTION OF THE INVENTION

Multilevel inverters are used in high-power medium-voltage applications due to their superior performance compared to two-level inverters. Space vector pulse width modulation (SVPWM) is preferred among various modulation strategies for multilevel inverters because SVPWM offers significant flexibility to optimize switching waveforms, and because SVPWM is well suitable for digital signal processor implementation. In order to reduce the harmonics and voltage surges during the switching transients, the "Nearest Three Vectors" (NTV), is commonly adopted for SVPWM.

For an n-level inverter, however, there are $n^3$ switching states and $6(n-1)^2$ triangles in the space vector diagram. The complexity of conventional SVPWM for multilevel inverters is due to the difficulty in determining the location of the reference vector, the calculation of duty cycles, and the determination and selection of switching states. As the level of the inverter increases, the increased number of switching states, triangles, and calculation of duty cycles adds to the complexity of conventional SVPWM for multilevel inverters.

Moreover, the inherent voltage drift of the DC-link capacitors of the multilevel inverters can reduce the control accuracy of SVPWM and thus degrade the performance of the multilevel inverters, in terms of higher voltage pressure on the power devices, higher harmonics, higher electromagnetic interference, and so on. If the voltage drift of the DC-link capacitors is not limited during the operation of the multilevel inverter, then the unbalances of DC-link capacitor voltages can even lead to the collapse of some of these voltages under a wide range of operating conditions.

Figure 1:
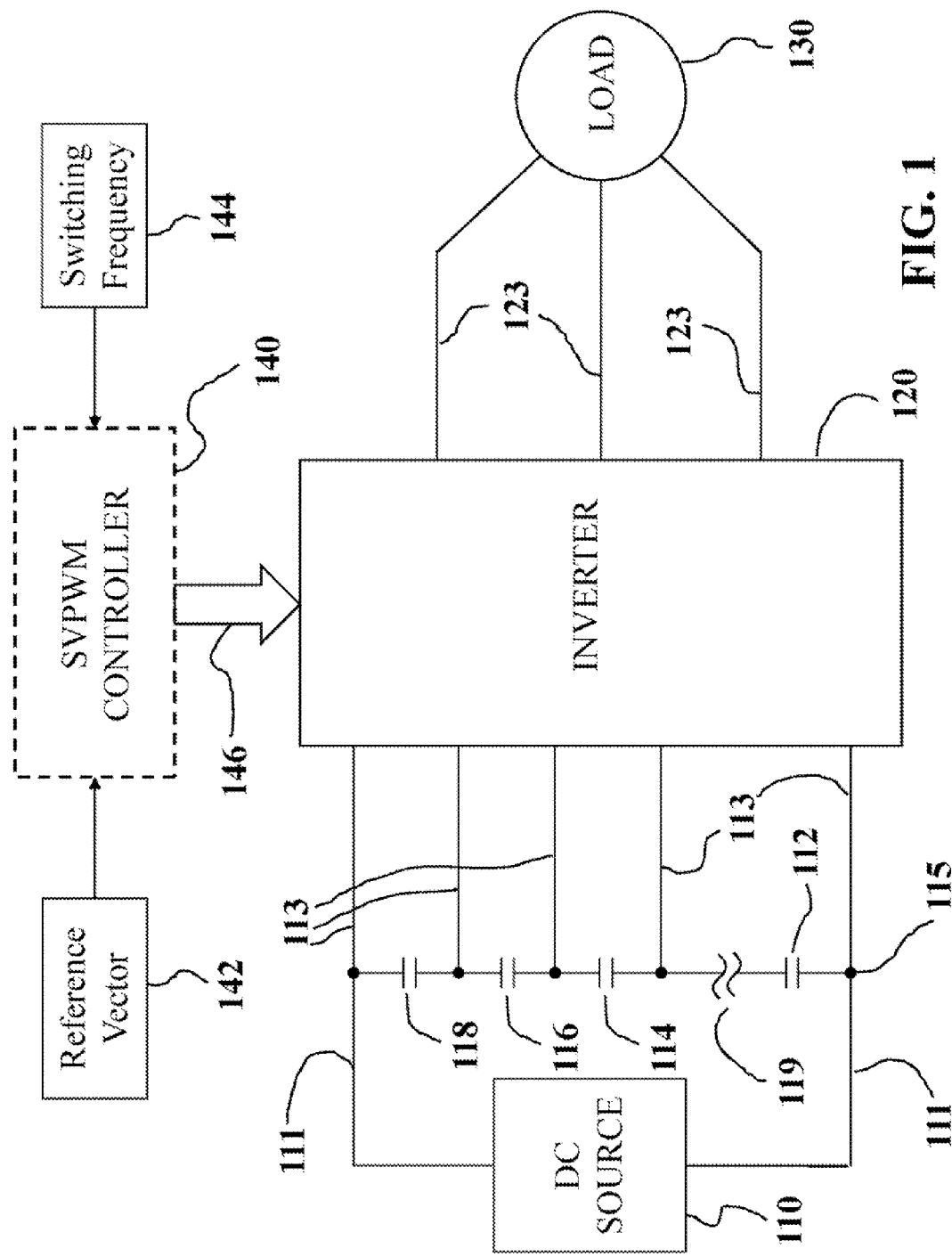
FIG. 1 is a block diagram of a multilevel inverter according to some embodiments of the invention.

FIG. 1. shows an example of a multilevel inverter according to some embodiments of the invention. Voltage of the DC source 110 is supplied on input lines 111 to the capacitors. For an n-level inverter, usually there are (n−1) capacitors preferably, but not necessary, having the same nominal capacitance value. In this example, the capacitors are connected in parallel with the DC source 110. Those capacitors are preferably charged with the same voltage. Only four capacitors 112, 114, 116, and 118 are shown in FIG. 1, and the symbol 119 means all the other capacitors are omitted. The voltages of the capacitors are supplied on input lines 113 to the inverter 120. The inverter 120 provides AC voltage through output lines 123 to the load 130. The gate driving signals 146 of the inverter 120 are produced by the SVPWM controller 140 according to the command reference voltage 142 and the command switching frequency 144.

For an n-level inverter, the output voltage vector is $$V_{out} = V_{dc} \cdot \left(S_a + S_b \cdot e^{j\frac{2}{3}\pi} + S_c \cdot e^{j\frac{4}{3}\pi}\right), \quad (1)$$

where $V_{dc}$ is voltage of the DC source 110, and $S_a$, $S_b$, and $S_c$ are the switching states of phase A, B, and C, respectively. For an n-level inverter, there are n switching states of each phase, which represent n different voltage levels of the phase and the different voltage levels are 0, $V_{dc}/(n-1)$, $2 \cdot V_{dc}/(n-1)$, ... $V_{dc}$ when the voltage of the DC source negative pole 115 is considered as a base. If the value of $S_a$, $S_b$ and $S_c$ are $S_a$, $S_b$, $S_c$=0, 1, ... n−1, then the output voltage of phase A, B, and C are $$\frac{V_{dc}}{n-1} \cdot S_a, \frac{V_{dc}}{n-1} \cdot S_b, \text{ and}$$

$$\frac{V_{dc}}{n-1} \cdot S_c,$$

respectively.

Figure 2A:
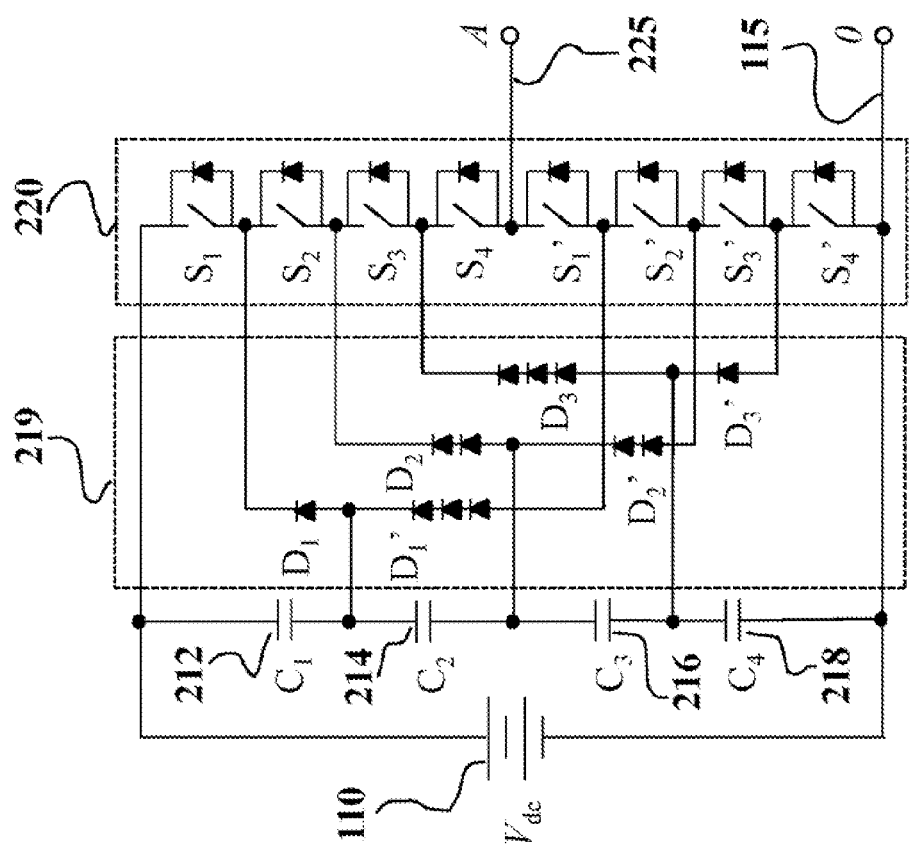
Figure 2B:
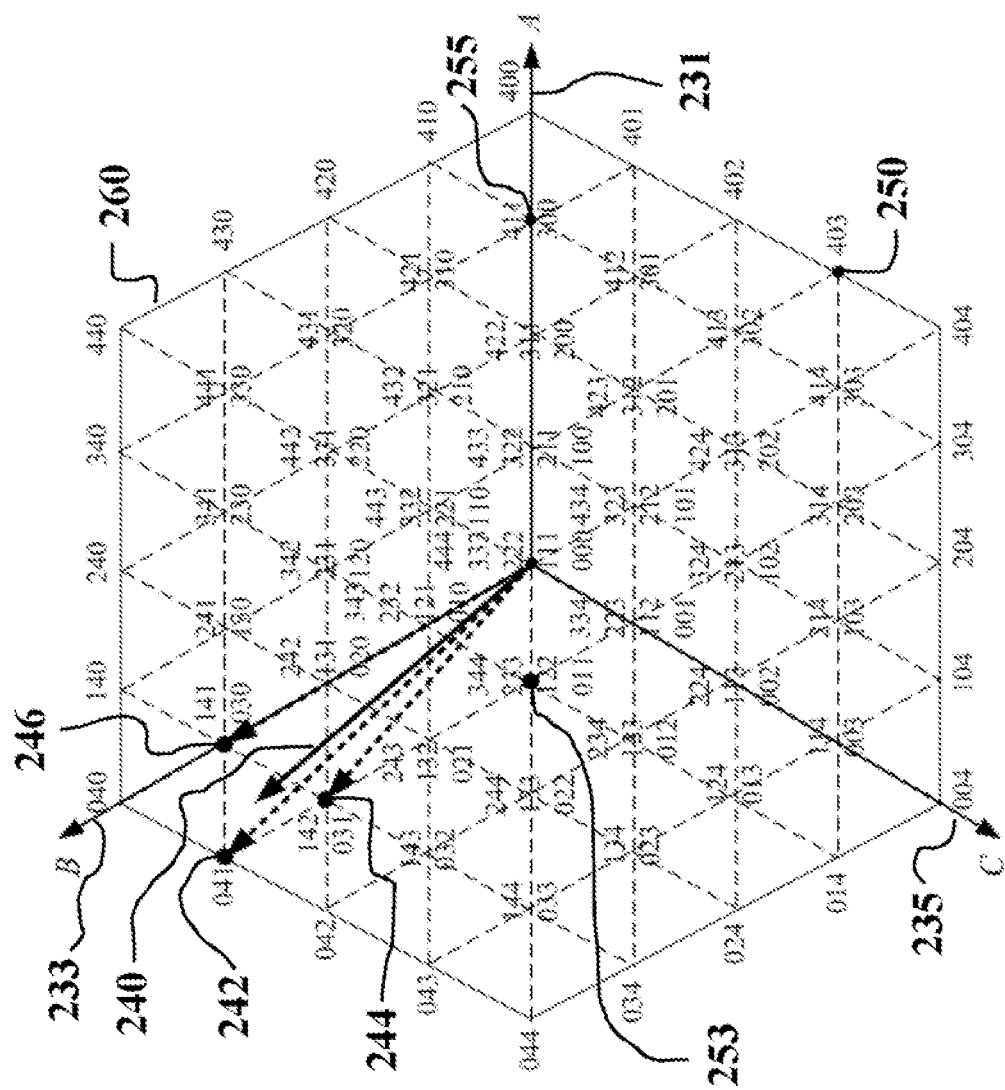

FIGS. 2A-C show an example of a basic circuit structure of one phase of a five-level inverter, and corresponding space vector diagram of switching states, and ON-OFF statuses of the switches. In FIG. 2A, elements 212, 214, 216, and 218 are capacitors and 219 are clamped diodes. The switching state of a phase 225 and the corresponding ON-OFF statuses of the switches 220 are shown in FIG. 2C, where the status 1 means the switch is turned-ON and the status 0 means the switch is turned-OFF.

FIG. 2B shows a space vector diagram of the five-level inverter of FIG. 2A. The space vector diagram includes all possible output voltage vectors and the corresponding switching states of the three phases determined according to Equation (1). The axes A 231, B 233, and C 235 correspond to the three AC output phases. The space vector diagram includes a hexagon 260 having a size proportional to the level of the inverter, and each vertex on and inside the hexagon 260 represents an output voltage vector. The numbers at the vertices on and inside the hexagon 260 denote the switching states combining the three phases. For example, the number at vertex 250 is 403, which means the switching states for phase A, B, and C are 4, 0, and 3, respectively. As can be seen from FIG. 2B, some different switching states, e.g. 411 and 300 at vertex 255, can produce the same three-phase output voltage vector, thus those switching states are redundant switching states. The redundant switching states increase the complexity of conventional SVPWM for multilevel inverters. In the space vector diagram of FIG. 2B, the redundant switching states at each vertex are listed decreasingly from top to bottom according to the switching states of phase A.

The objectives of SVPWM can include finding the nearest three vectors of the reference vector, determining the duty cycles of the nearest three vectors, and selecting the appropriate switching states and switching sequence. For example, some embodiments determine the nearest three vectors $V_{01}$ 242, $V_{02}$ 244, and $V_{03}$ 246 of the reference vector $V_{ref}$ 240 of the vertices 242, 244, and 246. The duty cycles $d_1$, $d_2$, and $d_3$ of the nearest three vectors 242, 244, and 246 can be determined according to $$V_{ref}/f_s = d_1 \cdot V_{01} + d_2 \cdot V_{02} + d_3 \cdot V_{03}, \quad (2)$$

where $f_s$ is the command switching frequency 144. The vertices 242, 244, and 246 form a triangle, which encloses the reference vector 240 and is called the "modulation triangle" in the present invention. The length of each side of each modulation triangle in the present invention is $V_{dc}$, where $V_{dc}$ is the voltage of the DC source 110.

Some embodiments of the invention enable a space vector modulation of a multilevel inverter based on a space vector diagram of switching states of the inverter, such that the modulation does not require lookup tables and is adaptable to any type and level of the inverters. Specifically, the embodiments take advantage of a realization that a reference vector can be represented as a sum of a remainder vector connecting the reference vector with a first vertex of a modulation triangle enclosing the reference vector and a set of vertex vectors connecting a center vertex of the space vector diagram with the first vertex. This realization allows locating a modulation triangle enclosing the reference vector in the space vector diagram, and determining the switching states of the vertexes of that modulation triangle.

Figures 3A, 3B:
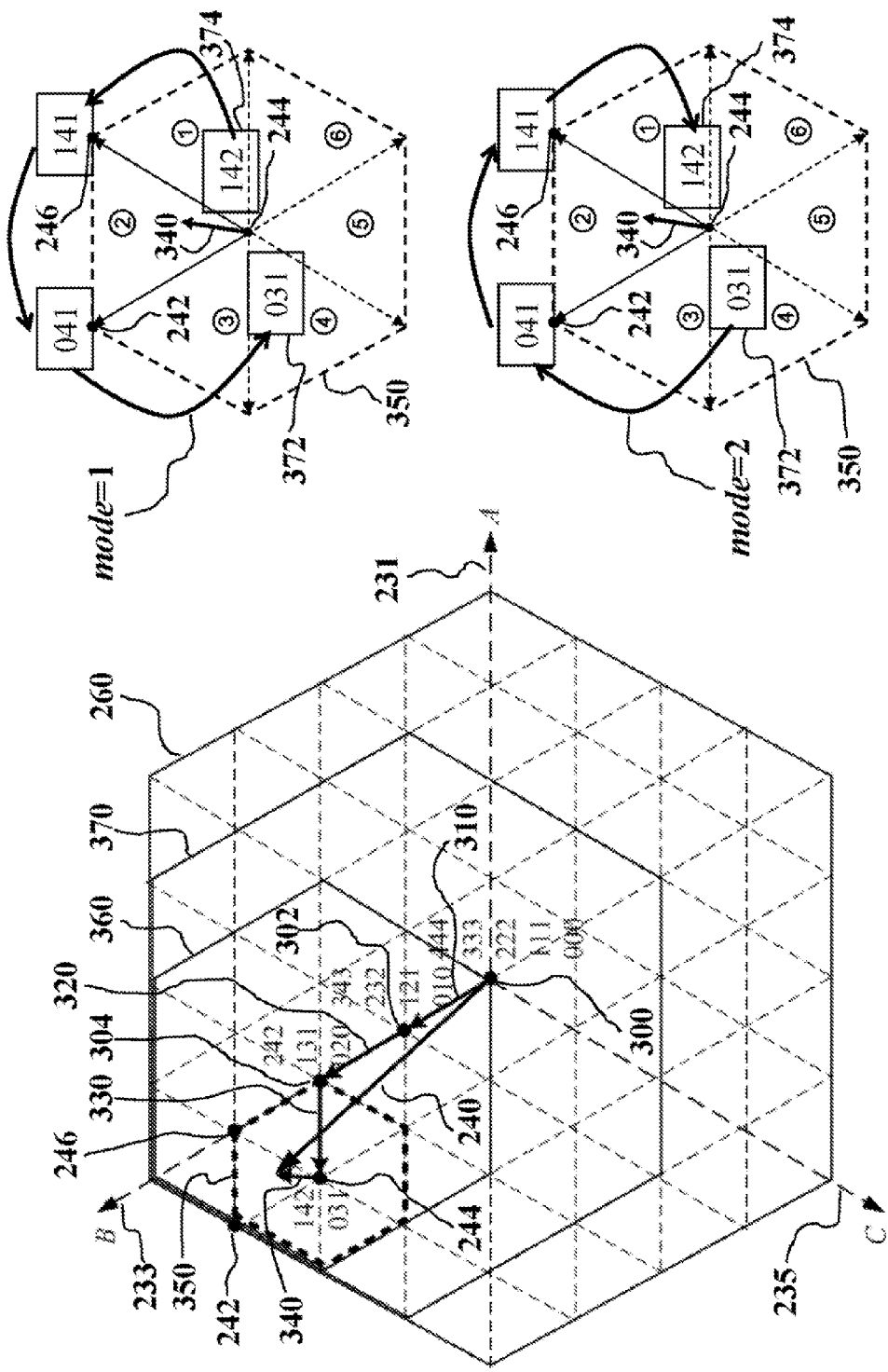
FIG. 3A is a schematic of a location method for the reference vector according to some embodiments of an invention.
FIG. 3B is a schematic of calculation of the duty cycles and selection of the switching sequence according to some embodiments of the invention.
Figure 3C:
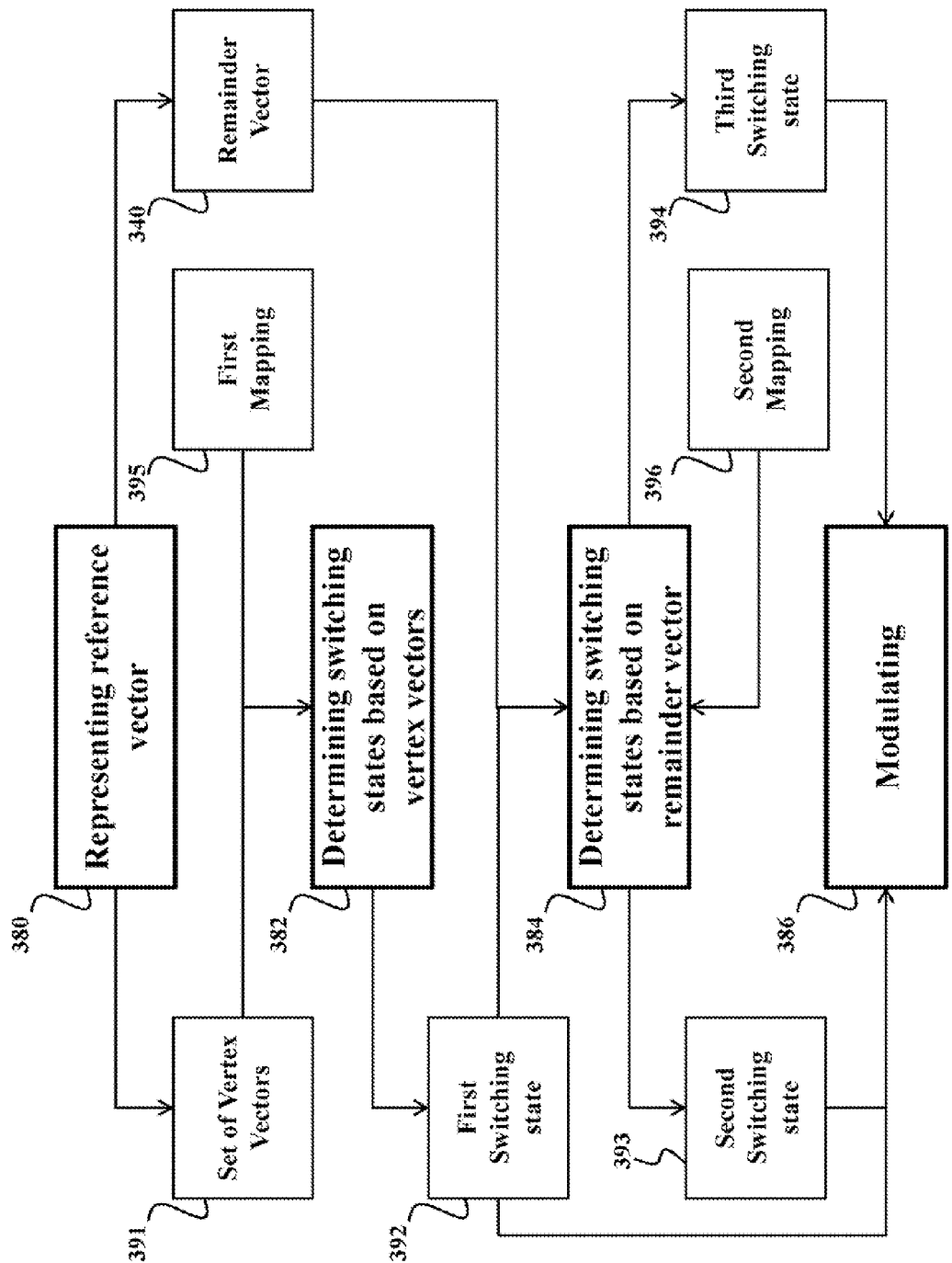
FIG. 3C is a diagram of a modulation method employed by some embodiments of the inventioned.

FIGS. 3A-C schematically show realization and a diagram of a modulation method employed by some embodiments. For purposes of exemplifying the realization, the space vector diagram of a five-level inverter, as shown in FIG. 2B, is used to illustrate the SVPWM method of the embodiments. It is understood that the SVPWM method can be implemented in any level inverters.

The reference vector 240 is represented 380 as a sum of a set 391 of "vertex vectors" 310, 320, and 330 and a "remainder vector" 340. A "vertex vector" 310, 320, or 330 is a vector connecting two adjacent vertices, e.g. the vertex vector 310 connects adjacent vertices 300 and 302, and the length of the vertex vector is multiple of $V_{dc}$, where $V_{dc}$ is the voltage of the DC source 110. The multiple of $V_{dc}$ also defines a unit value of a difference between phases of the switching states of adjacent vertices. Typically, the multiple, and the unit value equal one.

The vertex vectors 310, 320, and 330 connect the center vertex 300 of the hexagon 260 with the first vertex 244 of the modulation triangle enclosing the reference vector 240. The "remainder vector" 340 is the vector enclosed by the modulation triangle and connecting the first vertex 244 with the reference vector 240.

In one embodiment, the set of vertex vectors 310, 320, and 330 are determined based on a set of nested hexagons 370, 360, and 350 enclosing the reference vector 240. Each nested hexagon 370, 360, or 350 corresponds to a specific level ranging from (n−1) to a second level, and centers at the vertex 302, 304, or 244 of the vertex vector 310, 320, or 330. More detailed description of this embodiment for determining the set of vertex vector is provided below.

In another embodiment, the set of vertex vectors are determined based on increase or decrease the difference between the reference and the vertex vector. For example, for each interaction, a set of possible vertex vectors is tested, and the vertex vector subtracted from the reference vector and resulting in a minimum subtracted vector is selected. In alternative embodiment, the selection of the set of vertex vector is arbitrarily until a magnitude of the subtracted vector is less than a magnitude of the vertex vector, i.e., the subtracted vector is the remainder vector.

The switching states at the vertices 302, 304, and 244 are determined 382 iteratively for each vertex vector 310, 320, and 330 in the set 391, starting from a current switching state of the inverter at the origin vertex 300. For each iteration, a corresponding phase of the current switching state is modified to produce a first switching state 392 of the inverter at the first vertex 244. For each iteration, a type of a modification and the corresponding phase is determined based on a function s of the angle φ of the corresponding vertex vector related to axis A 231, and the corresponding phase is increased or decreased by the unit value based on the type of the modification. In one embodiment, in accordance with the definition of the switching states in Equation (1), the unit value is selected as one. It is understood that the unit value can be selected as other values if the switching states are defined differently.

In some embodiments, the first switching state of the inverter at the first vertex is determined based on angles of vertex vectors in the set and a first mapping 395 between functions of the angles of vertex vectors and types of modification of the switching states. For example, in one embodiment, the function of the angle φ of the corresponding vertex vector can be simply described as $$s = 3\phi/\pi, \quad (3)$$

where $0 \leq \phi \leq 2\pi$.

Typically, the modulation triangles are equilateral, and thus, the angle φ of the vertex vector is multiple of a minimum angle between two adjacent vertex vectors, such as of π/3. Accordingly, in some embodiments, the function of the angle of the vertex vector includes a ratio of the angle of vertex vector with the minimum angle between two adjacent vertex vectors. That ratio can be mapped to a type of modification of a switching state to produce the first mapping.

FIG. 4A shows an example of the first mapping of the ratio determined by the function s to the type of modification that includes increase or decrease of a value of a phase of the switching state by a unit value. In FIG. 4A, the letters A, B, or C means the switching state of phase A, B, or C needs to be modified, respectively. The up-arrow "↑" means the switching state needs to increase by the unit value, e.g., by one, and the down-arrow "↓" means the switching state needs to decrease by one.

For example, if s=3, then the modification for the switching states is "B↑", which means the switching states at the current vertex need to increase by one for the switching state of phase B. Since the switching states for each phase of an n-level inverter can only value from 0 to (n−1) in the present invention, a modified switching state needs to be excluded when the corresponding switching state of phase A, B, or C is larger than (n−1) or less than zero.

Based on the first mapping of FIG. 4A, the switching states 480 at the first vertex 244 of the modulation triangle and the vertices 302 and 304 are shown in FIG. 3A and FIG. 4B, which can be verified by being compared with the space vector diagram shown in FIG. 2B. The invalid switching states 490, i.e., 454, 353, and −120 are excluded sequentially, as shown in FIG. 4B.

After the first switching state is determined, some embodiments determine a second switching state 393 of the inverter at a second vertex of the modulation triangle and a third switching state 394 of the inverter at a third vertex of the modulation triangle based on an angle of the remainder vector 340. Next, the inverter is modulated 386 based on the first, the second, and the third switching states. Some embodiments also determine duty cycles and the switching sequence of the inverter.

FIG. 3B shows a determination of the duty cycles and the switching sequence. The duty cycles can be determined using principles of a two-level inverter, because the remainder vector 340 is inside a hexagon 350 which is a space vector diagram of a two-level inverter. Determining the switching sequence means to determine the appropriate switching states of the inverter at a second vertex 242 and at a third vertex 246 of the modulation triangle and to select the appropriate sequence of the switching states at the vertices 242, 244, and 246.

There are two switching sequence modes used by embodiments, i.e., the switching sequence mode is mode=1 when the switching sequence is counterclockwise selected, and the switching sequence mode is mode=2 when the switching sequence is clockwise selected. In one embodiment, the switching sequence is determined based on the switching sequence mode and a function reg of the angle δ of the remainder vector 340 related to axis A 231, and the function reg of the angle δ can be described as $$3\delta/\pi < \text{reg} \leq 3\delta/\pi + 1 \quad (4)$$

where $0 \leq \delta < 2\pi$ and reg=1, 2, ... 6. In some embodiments, the function reg is basically a region number of the modulation triangle nested in a second-level diagram based on the angle of the remainder vector.

For example, in one embodiment, a second switching state 393 of the inverter at a second vertex of the modulation triangle and a third switching state 394 of the inverter at a third vertex of the modulation triangle are determined based on the first switching state 392, the remainder vector 340 and a second mapping 396 of a function of an angle of the remainder vector, switching sequence modes, and the types of modification of the switching states.

Figures 5A, 5B:
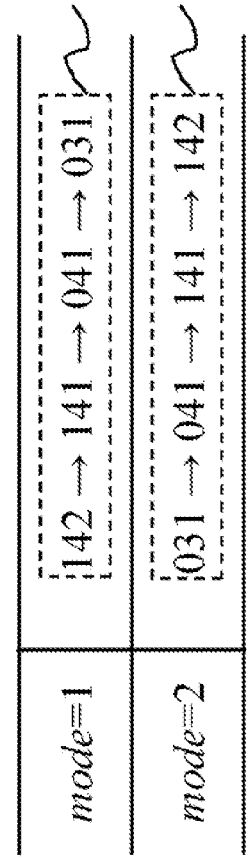
FIG. 5A is a schematic of switching sequence selection method according to some embodiments of the invention.
FIG. 5B is a schematic of illustration of applying the switching sequence selection shown in FIG. 5A to produce switching sequence for the reference vector illustrated in FIG. 3A according to some embodiments of the invention.

FIG. 5A shows an example of the second mapping 396 in a tabular form. In this example of the second mapping, each element of the mapping includes five sub-elements. For example, "ABC↑(L)" when the function reg=1 and mode=1, and "ACB↓(U)" when reg=3 and mode=2. The letter A, B, or C means the switching state of phase A, B, or C to be modified sequentially. The symbol "↑" or "↓" means the state of the corresponding phase is modified by the unit value, e.g., increased by one or decreased by one, respectively.

In the space vector diagram, the redundant switching states at each vertex are listed decreasingly from top to bottom corresponding to the switching states of phase A, as shown in FIG. 2B. The letter "L" in the parentheses represents the word "lower" and means the first switching state at the first vertex 244 of the modulation triangle is not the top one, and the letter "U" in the parentheses represents the word "upper" and means the first switching state at the first vertex 244 of the modulation triangle is not the bottom one. As an example, for the remainder vector 340 shown in FIG. 3B, the value of reg is reg=2.

FIG. 5B shows the switching sequences according to different switching sequence modes determined based on the second mapping of FIG. 5A. The accuracy of the switching sequences can be verified based on space vector diagram of FIG. 2B. In some embodiments, the function reg of the remainder vector 340 is determined using digital signal processor implementation, as described below.

Figure 6:
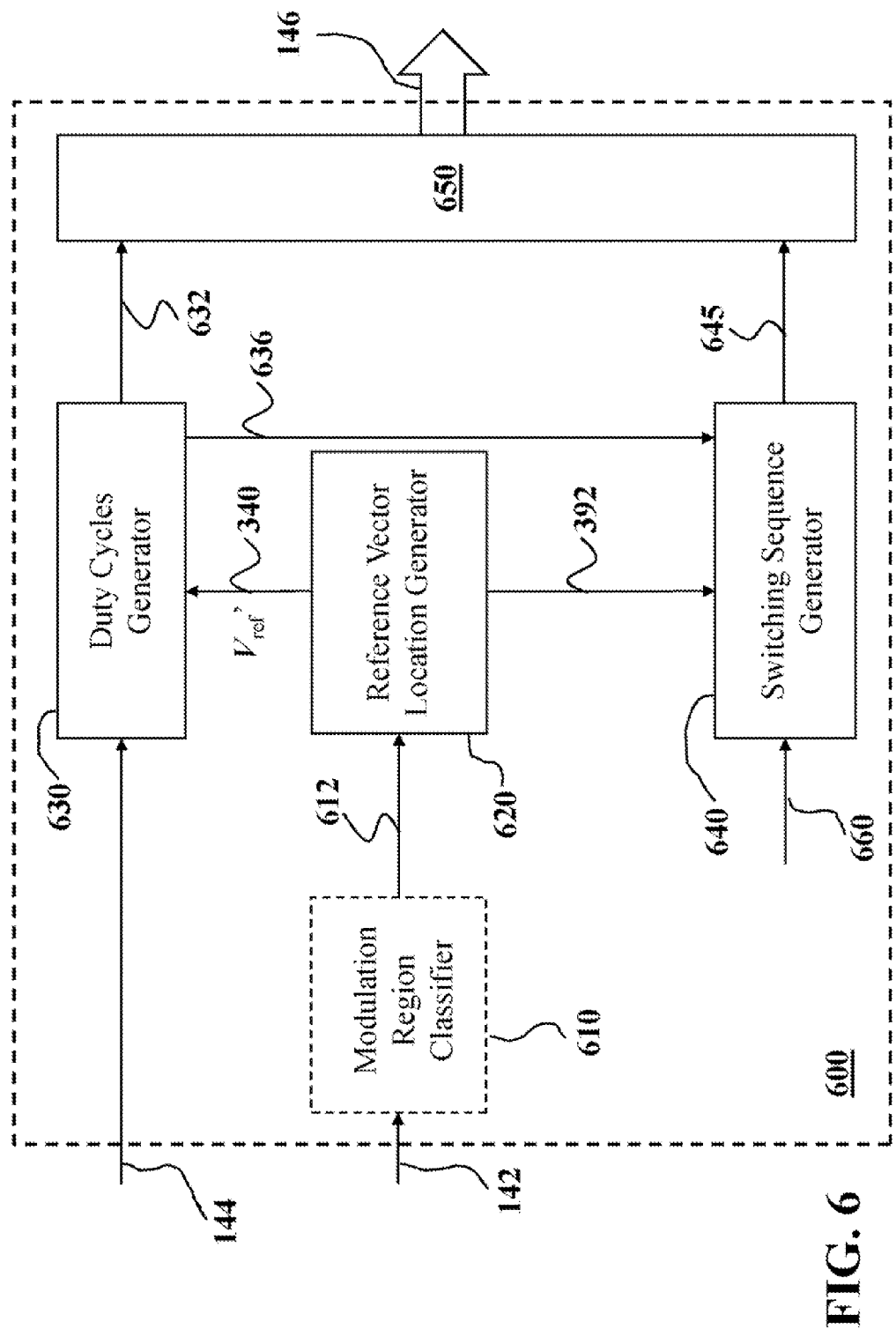
FIG. 6 is a block diagram of the space vector pulse width modulation controller according to some embodiments of the invention.

FIG. 6 shows a block diagram of the SVPWM controller 140 according to one embodiment of the invention. The SVPWM controller 140 of this embodiment can be implemented using a processor 600 and can include a modulation region classifier 610, a reference vector location generator 620, a duty cycles generator 630, and a switching sequence generator 640. Other embodiments of the invention can include more or less modules than embodiments of FIG. 6. For example, one embodiment does not include the modulation region classifier 610.

A command reference voltage 142 is at first classified and modified by the modulation region classifier 610 according to the magnitude of the command reference vector 142. The modulation region classifier 610 is enclosed by dashed line because the modulation region classifier 610 is a recommended option, and the modulation region classifier 610 is not necessary when the command reference voltage 142 is not in over-modulation region or in low-modulation region. The classified and modified reference vector 612 is then used by the reference vector location generator 620 to determine the remainder vector $V'_{ref}$ 340 and to determine the switching states 392 at the first vertex 244 of the modulation triangle.

Based on $V'_{ref}$ and the switching frequency 144, the duty cycles generator 630 determines the value 636 of function reg and the duty cycles 632. The switching sequence generator 640 then produces the switching sequence 645 according to the switching states at the first vertex 244 of the modulation triangle, the value of reg, and the selected switching sequence mode 660. Finally, the generated switching sequence and the obtained duty cycles are decoded by a decoder 650 according to, e.g., a method of FIG. 2C and sent to the inverter 120 as gate driving signals 146.

Classification of the Modulation Region

The command reference vector 142 for an n-level inverter is $$V_{ref} = (n-1) \cdot \left( V_a^* + V_b^* \cdot e^{j\frac{2}{3}\pi} + V_c^* \cdot e^{j\frac{4}{3}\pi} \right) = V_m \cdot e^{j\theta} = V_x + j \cdot V_y, \quad (5)$$

where $V_a^*$, $V_b^*$, and $V_c^*$ are the command reference voltage of phase A, B, and C, respectively. $V_m$ is the magnitude of the command reference vector 142, and θ is the phase angle of the command reference vector 142. $V_x$ and $V_y$ are real numbers and represent the real part and imaginary part of $V_{ref}$ 142, respectively.

In one embodiment, the command reference vector is at first classified into different modulation regions according to the magnitude of the reference vector by the modulation region classifier 610. For purposes of exemplifying the embodiment, the space vector diagram of the five-level inverter as shown in FIG. 2B is used as an example to illustrate the classification method.

Figure 7A:
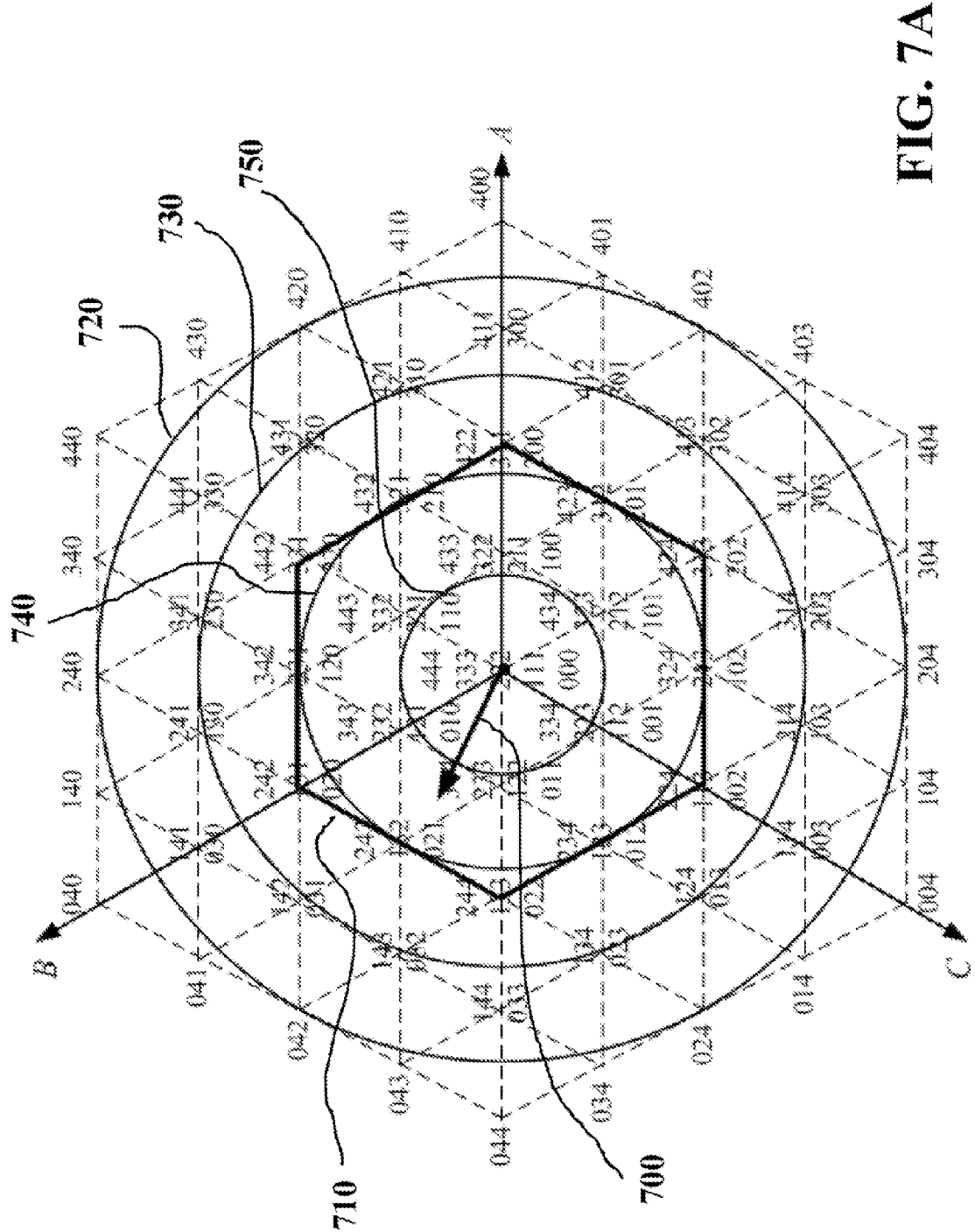
FIG. 7A is a schematic of classification method for the reference vectors according to some embodiments of the invention.

FIG. 7A shows an example of the classification method in the invention of one embodiment, in which the space vector diagram is partitioned into different regions by circles 720, 730, 740, and 750, whose centers all are the origin of the n-level space vector diagram. Each circle 720, 730, 740, or 750 is an inscribed circle of a hexagon, and the hexagon represents the space vector diagram of a certain level inverter. For example, the circle 740 is an inscribed circle of a hexagon 710, which is a space vector diagram of a three-level inverter.

For an n-level inverter, there are n regions as $$r = \begin{cases} n, & \text{if } V_m > \frac{\sqrt{3}}{2} V_{dc} \cdot (n-1); \\ n-1, & \text{else if } V_m > \frac{\sqrt{3}}{2} V_{dc} \cdot (n-2); \\ n-2, & \text{else if } V_m > \frac{\sqrt{3}}{2} V_{dc} \cdot (n-3); \\ \vdots \\ 1, & \text{else if } V_m \geq 0. \end{cases} \quad (6)$$

In some embodiments, the region is called "over-modulation region" when r=n; when r=n−1, the region is called "regular region;" when 0<r<n−1, the region is called "low-modulation region."

The modulation region classifier 610 can modify the reference vector $V_{ref}$ 142 according to the region that the reference vector $V_{ref}$ 142 lies in. Define the reference vector modified by the modulation region classifier as $$V_{ref0} = V_{m0} \cdot e^{j\theta_0} = V_{rx0} + j \cdot V_{ry0}, \quad (7)$$

where $V_{m0}$ is the magnitude of the modified reference vector $V_{ref0}$, and $\theta_0$ is the phase angle of the modified reference vector $V_{ref0}$. $V_{rx0}$ and $V_{ry0}$ are real numbers and represent the real part and imaginary part of $V_{ref0}$, respectively.

When the command reference vector $V_{ref}$ 142 is located in the "regular region," i.e., r=n−1, or the "low-modulation region", i.e., 0<r<n−1, the command reference vector $V_{ref}$ 142 does not need to be modified by the modulation region classifier 610, so $$V_{ref0} = V_{ref}, \quad (8)$$

and the values of $V_{m0}$, $\theta_0$, $V_{rx0}$, and $V_{ry0}$ can be obtained by Equation (7).

Figure 7B:
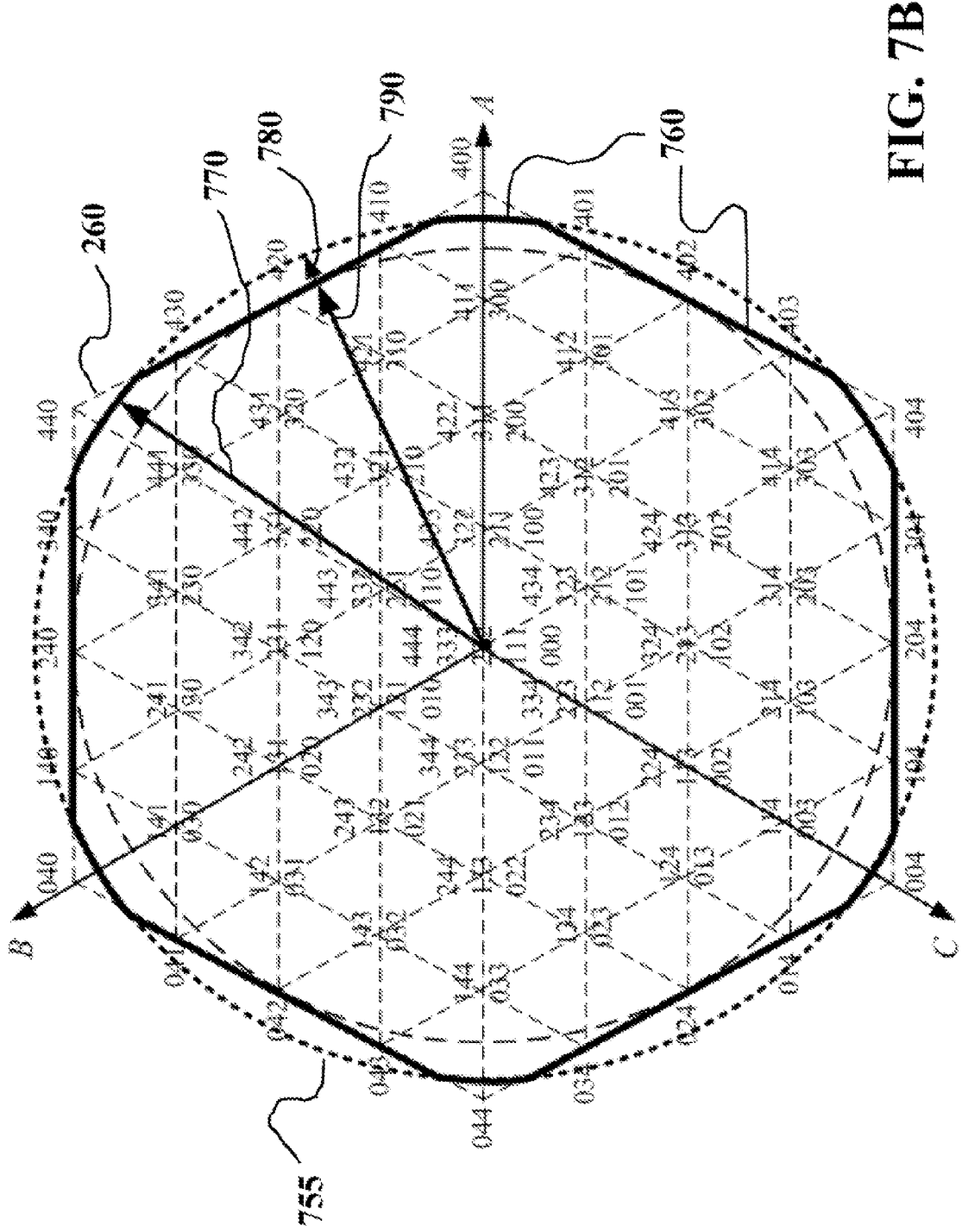
FIG. 7B is a schematic of adjustment for the reference vectors at over-modulation region according to some embodiments of the invention.

FIG. 7B shows an example of the reference vector $V_{ref}$ 142 located in the "over-modulation region", i.e., r=n, i.e., the command reference vector 142 is modified by the modulation region classifier 610. The circle 755 with the radius of $V_m$, i.e., the magnitude of the command reference vector $V_{ref}$ 142, and the circle 755 is the requested reference vector trajectory. Limited by the n-level space vector diagram, however, the real reference vector trajectory is drawn by bolded lines 760.

There are two possible locations of the command reference vector $V_{ref}$ 142. One possible location of $V_{ref}$ is that the command reference vector $V_{ref}$ is inside the n-level space vector diagram, e.g. the vector $V_{r1}$ 770, and in this condition $V_{r1}$ does not need to be modified by the modulation region classifier 610. The other possible location of $V_{ref}$ 142 is that the command reference vector $V_{ref}$ is outside the n-level space vector diagram, e.g. the vector $V_{r2}$ 780, and in this condition $V_{r2}$ needs to be modified to the vector $V_{r3}$ 790.

In one embodiment, the modified reference vector $V_{ref0}$ for the reference vector $V_{ref}$ locating in the "over-modulation region" is calculated as follows $$V_{ref0} = \qquad (9)$$

$$\begin{cases} \min\left(V_m, \frac{\sqrt{3}}{2}V_{dc} \cdot (n-1) \cdot \tan\left(\left|\theta - \frac{1}{6}\pi\right|\right)\right) \cdot e^{j\theta}, & \text{if } \left(0 < \theta \leq \frac{1}{3}\pi\right); \\ \min\left(V_m, \frac{\sqrt{3}}{2}V_{dc} \cdot (n-1) \cdot \tan\left(\left|\theta - \frac{1}{2}\pi\right|\right)\right) \cdot e^{j\theta}, & \text{else if } \left(\frac{1}{3}\pi < \theta \leq \frac{2}{3}\pi\right); \\ \min\left(V_m, \frac{\sqrt{3}}{2}V_{dc} \cdot (n-1) \cdot \tan\left(\left|\theta - \frac{5}{6}\pi\right|\right)\right) \cdot e^{j\theta}, & \text{else if } \left(\frac{2}{3}\pi < \theta \leq \pi\right); \\ \min\left(V_m, \frac{\sqrt{3}}{2}V_{dc} \cdot (n-1) \cdot \tan\left(\left|\theta - \frac{7}{6}\pi\right|\right)\right) \cdot e^{j\theta}, & \text{else if } \left(\pi < \theta \leq \frac{4}{3}\pi\right); \\ \min\left(V_m, \frac{\sqrt{3}}{2}V_{dc} \cdot (n-1) \cdot \tan\left(\left|\theta - \frac{3}{2}\pi\right|\right)\right) \cdot e^{j\theta}, & \text{else if } \left(\frac{4}{3}\pi < \theta \leq \frac{5}{3}\pi\right); \\ \min\left(V_m, \frac{\sqrt{3}}{2}V_{dc} \cdot (n-1) \cdot \tan\left(\left|\theta - \frac{11}{6}\pi\right|\right)\right) \cdot e^{j\theta}, & \text{else if } \left(\frac{5}{3}\pi < \theta \leq 2\pi\right). \end{cases}$$

where $\min(a, b)$ means the smaller one between a and b, $|c|$ means the absolute value of c. Then the values of $V_{m0}$, $\theta_0$, $V_{rx0}$, and $V_{ry0}$ can be determined using Equation (7).

Determining Set of Vertex Vectors of Reference Vector

Determining the location of the reference vector includes determination of the switching states at the first vertex 244 of the modulation triangle of the command reference vector 142. Such determination can be treated differently by the reference vector location generator 620 according to the modulation region in Equation (6) and the modified reference vector $V_{ref0}$ in Equation (8) or Equation (9) determined by the modulation region classifier 610.

Generally, if the modulation region of the command reference vector $V_{ref}$ 142 of the n-level inverter is r determined by Equation (6) and 0<r<n−1, i.e., then the command reference vector $V_{ref}$ is in the "low-modulation region," then the command reference vector $V_{ref}$ is treated as in a (r+1)-level space vector diagram instead of in a n-level space vector diagram by the reference vector location generator 620 of the invention. For example, the modulation region for the reference vector 700 shown in FIG. 7A is r=2<n−1, thus the reference vector 700 is in the low-modulation region and is treated as in a 3-level space vector diagram by the reference vector location generator 620 of the invention.

If the modulation region of the command reference vector $V_{ref}$ of the n-level inverter is r determined by Equation (6) and r=n−1, i.e., then the command reference vector $V_{ref}$ is in the "regular region", or r=n, i.e., the command reference vector $V_{ref}$ is in the "over-modulation region," then the command reference vector $V_{ref}$ is treated as in the n-level space vector diagram by the reference vector location generator 620 of the invention. The difference is that when the command reference vector $V_{ref}$ is locating in the "over-modulation region", i.e., r=n, the command reference vector $V_{ref}$ is modified by Equation (9). If the reference vector $V_{ref}$ is in the "over-modulation region" or the "regular region," then the modified reference vector $V_{ref0}$ is treated as in the n-level space vector diagram by the reference vector location generator 620.

Figure 8A:
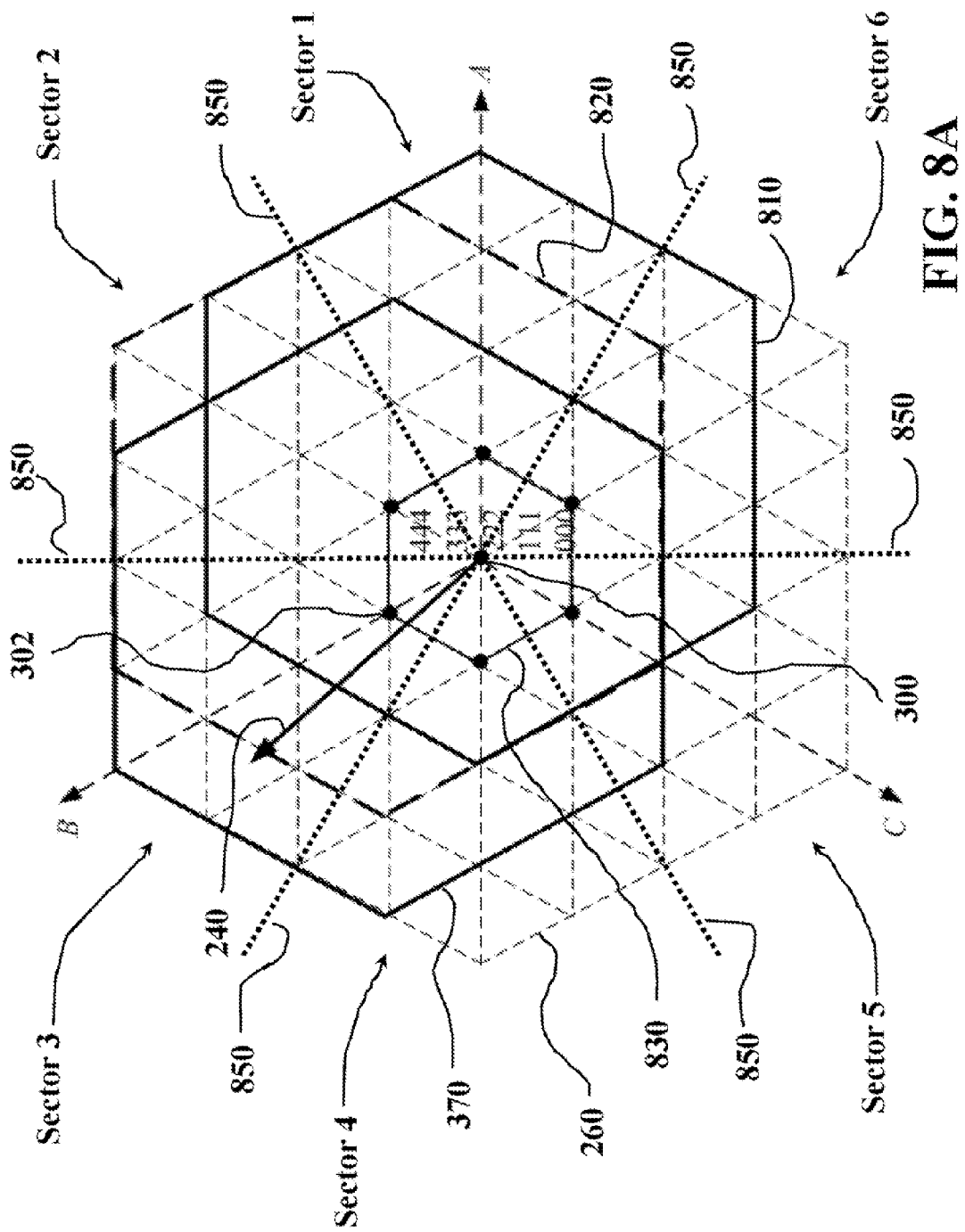
FIG. 8A-8C are schematics of steps for locating the reference vector according to some embodiments of the invention.
Figure 8B:
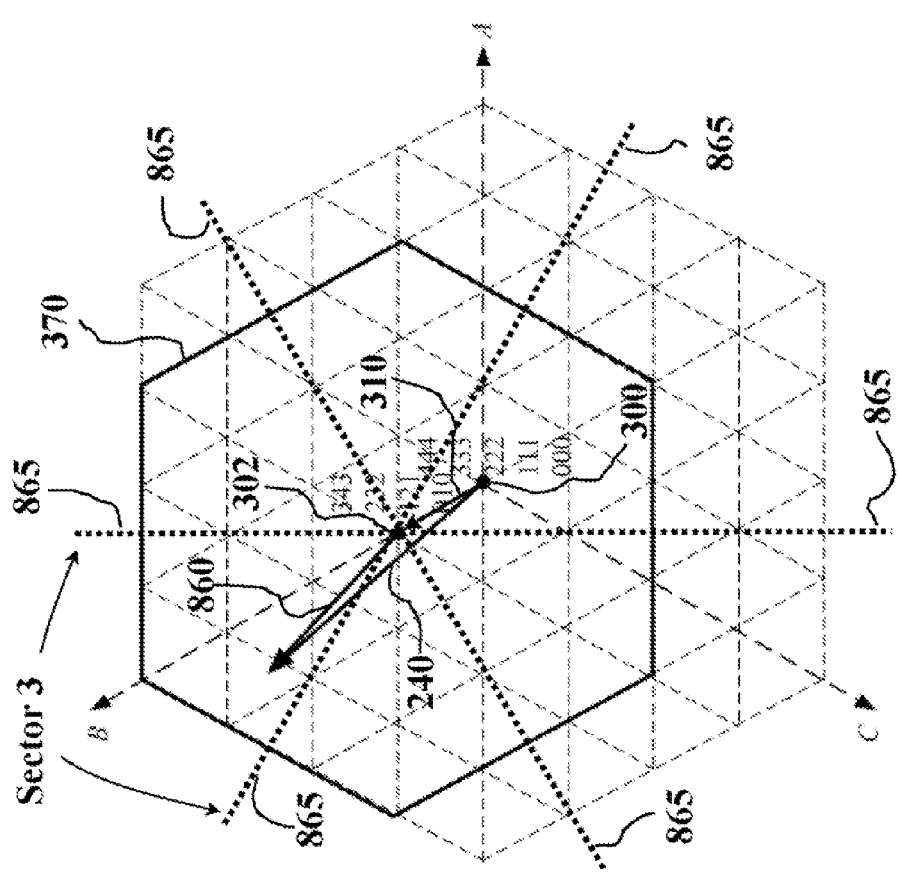
Figure 8C:
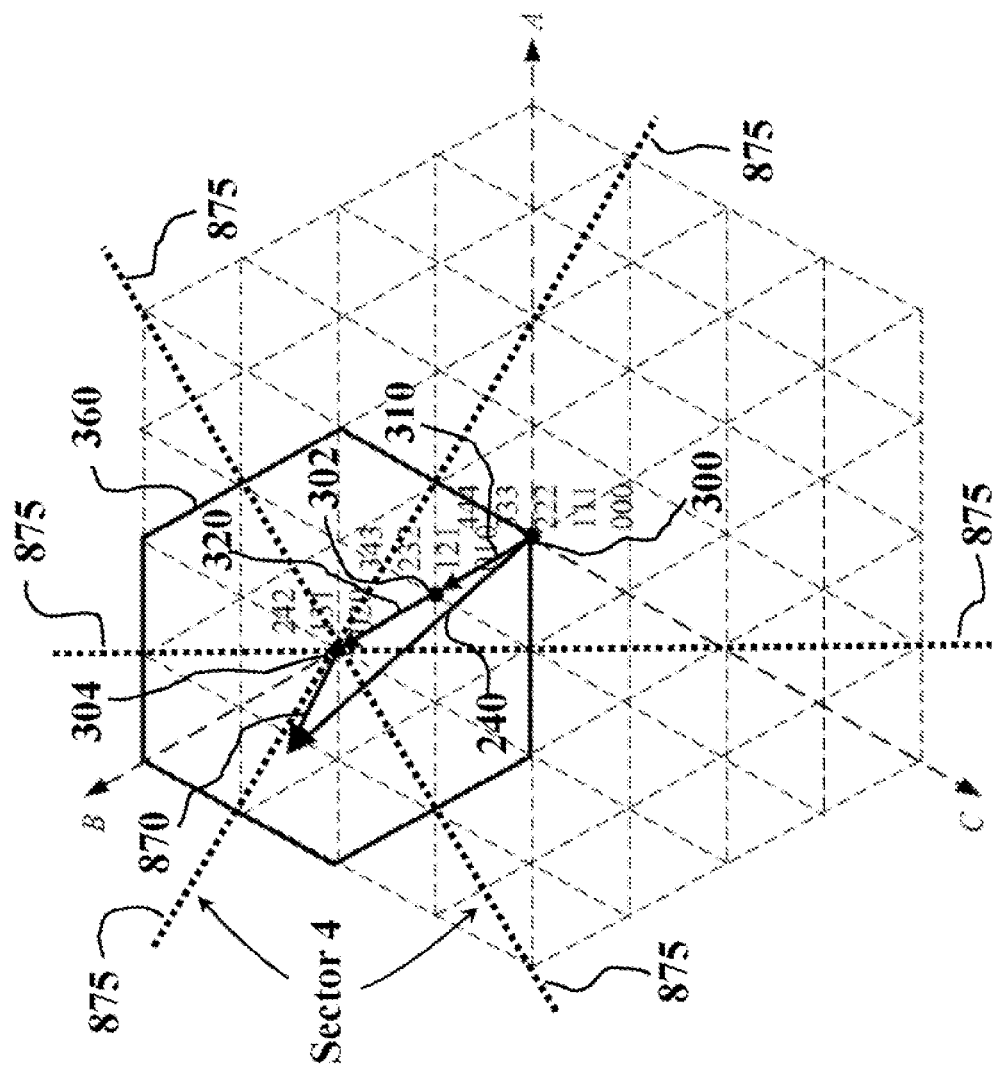

FIGS. 8A-C show an example of a method implemented by, e.g., the reference vector location generator 620, for determining the set of vertex vectors based on determining a set of nested hexagons 370, 360, and 350 enclosing the reference vector 240. For exemplifying purposes, the space vector diagram of the five-level inverter as shown in FIG. 2B is used in this example. It's understood that this method can be implemented in any level inverters.

The space-vector diagram of the n-level inverter is partitioned into six sectors by six dashed lines 850. The six dashed lines 850 pass through the center 300 of the n-level space-vector diagram and their angles are from $\pi/6$ to $11\pi/6$, and the angle between any two adjacent dashed lines is $\pi/3$. Then consider the space-vector diagram of the n-level inverter as being composed of six hexagons that are the space-vector diagrams of (n−1)-level inverters. For clarity, only three hexagons 810, 820, and 370 of the six hexagons that are the space-vector diagrams of (n−1)-level inverters are shown in FIG. 8A.

The center vertices of the six (n−1)-level hexagons also form a hexagon 830, whose center vertex 300 is the center vertex 300 of the original n-level space-vector diagram. For each sector enclosed by two adjacent dash lines 850, the reference vector lying within is considered as only belonging to one of the six (n−1)-level hexagons. Number the six (n−1)-level hexagons from 1 to 6, and consider the $i^{th}$ (i=1, 2, ... 6) sector belonging to the $i^{th}$ (n−1)-level hexagon, whose center vertex is in the $i^{th}$ sector. If the order number of the (n−1)-level hexagon 370 that contains the reference vector 240 is $s_1$ ($s_1$=1, 2, ... 6), then the order number of the selected (n−1)-level hexagon 370, called the nested (n−1)-level hexagon 370, can be determined by the phase angle $\theta_0$ of the reference vector $V_{ref0}$ 240 as $$\frac{3}{\pi}\theta_0 + \frac{1}{2} \leq s_1 < \frac{3}{\pi}\theta_0 + \frac{3}{2}. \qquad (10)$$

Some embodiments of the invention determine a set of nested hexagons enclosing the reference vector. Each nested hexagon corresponds to a specific level, wherein the specific level ranging from the level of the inverter to a second level inverter. Next, the set of vertex vectors sequentially connecting centers of the nested hexagons is determined. In those embodiments, the first vertex is a center vertex of the second level inverter.

For example, because the phase angle of the $V_{ref0}$ 240 shown in FIG. 8A is $\pi/2 < \theta_0 < 5\pi/6$, the order number of the nested (n−1)-level hexagon 370 containing the $V_{ref0}$ 240 is $s_1$=3. The value of $s_1$ can also be determined by Equation (11)

$$s_1 = \qquad (11)$$

$$\begin{cases} 1, & \text{if}\left(V_{rx0} > 0 \text{ and } -\frac{\sqrt{3}}{3}V_{rx0} < V_{ry0} \leq \frac{\sqrt{3}}{3}V_{rx0}\right); \\ 2, & \text{else if}\left(V_{rx0} > 0 \text{ and } V_{ry0} > \frac{\sqrt{3}}{3}V_{rx0}\right)\text{or}(V_{rx0} = 0 \text{ and } V_{ry0} > 0); \\ 3, & \text{else if}\left(V_{rx0} < 0 \text{ and } V_{ry0} > -\frac{\sqrt{3}}{3}V_{rx0}\right); \\ 4, & \text{else if}\left(V_{rx0} < 0 \text{ and } \frac{\sqrt{3}}{3}V_{rx0} \leq V_{ry0} < -\frac{\sqrt{3}}{3}V_{rx0}\right); \\ 5, & \text{else if}\left(V_{rx0} < 0 \text{ and } V_{ry0} < \frac{\sqrt{3}}{3}V_{rx0}\right); \\ 6, & \text{else.} \end{cases}$$

where $V_{rx0}$ and $V_{ry0}$ represent the real part and imaginary part of $V_{ref0}$ 240, respectively. The value of $s_1$ is used to determine the switching states at the center vertex 302 of the nested (n−1)-level hexagon 370 according to the first mapping of FIG. 4A.

After the value of $s_1$ is determined, the origin of the reference vector 240 is changed to the center 302 of the nested (n−1)-level hexagon 370. This is achieved by subtracting the vertex vector 310 connecting the two center vertices 300 and 302 of the n-level hexagon 260 and the nested (n−1)-level hexagon 370 from the reference vector 240, as shown in FIG. 8B. Generally, the new reference voltage vector $V_{ref(1)}$ 860, called the subtracted reference vector 860, can be obtained as $$V_{ref(1)} = V_{ref0} - V_{dc} \cdot e^{j(s_1-1)\pi/3} = V_{m(1)} \cdot e^{j\theta_1} = V_{rx(1)} + j \cdot V_{ry(1)}, \quad (12)$$

where $V_{dc}$ is voltage of the DC source 110, $s_1$ represents the order number of the nested (n−1)-level hexagon 370, $V_{m(1)}$ and $\theta_1$ are the magnitude and phase angle of the subtracted reference vector $V_{ref(1)}$ 860. $V_{rx(1)}$ and $V_{ry(1)}$ are real numbers and represent the real part and imaginary part of $V_{ref(1)}$ 860, respectively.

With the subtracted reference vector $V_{ref(1)}$ 860, the nested (n−1)-level hexagon 370 can also be partitioned into six sectors by dashed lines 865 and is composed of six hexagons that are the space-vector diagrams of (n−2)-level inverters. Then, a new subtracted reference vector $V_{ref(2)}$ 870 and the order number $s_2$ of a nested (n−2)-level hexagon 360 can be determined. The processing is similar to the processing with the n-level space-vector diagram described above. Repeat the above processing, as shown in FIG. 8A to FIG. 8C, until the finally selected nested hexagon 350 becomes the space-vector diagram of a second-level inverter, as shown in FIG. 3A. Accordingly, a center vertex of the nested hexagon of the specific level is determined based on the angle of a subtracted reference vector connecting a center vertex of a closest higher-level nested hexagon and the reference vector.

There are totally (n−2) such steps for an n-level inverter, and after the $(k+1)^{th}$ step, k=1, 2, ... n−3, the order number $S_{k+1}$ of the selected nested (n−k−1)-level hexagon and the subtracted reference vector $V_{ref(k+1)}$ are $$s_{k+1} = \begin{cases} 1, & \text{if}\left(V_{rx(k)} > 0 \text{ and } -\frac{\sqrt{3}}{3}V_{rx(k)} < V_{ry(k)} \leq \frac{\sqrt{3}}{3}V_{rx(k)}\right); \\ 2, & \text{else if}\left(V_{rx(k)} > 0 \text{ and } V_{ry(k)} > \frac{\sqrt{3}}{3}V_{rx(k)}\right) \text{ or } (V_{rx(k)} = 0 \text{ and } V_{ry(k)} > 0); \\ 3, & \text{else if}\left(V_{rx(k)} < 0 \text{ and } V_{ry(k)} > -\frac{\sqrt{3}}{3}V_{rx(k)}\right); \\ 4, & \text{else if}\left(V_{rx(k)} < 0 \text{ and } \frac{\sqrt{3}}{3}V_{rx(k)} \leq V_{ry(k)} < -\frac{\sqrt{3}}{3}V_{rx(k)}\right); \\ 5, & \text{else if}\left(V_{rx(k)} < 0 \text{ and } V_{ry(k)} < \frac{\sqrt{3}}{3}V_{rx(k)}\right); \\ 6, & \text{else.} \end{cases} \quad (13)$$

and $$V_{ref(k+1)} = V_{ref(k)} - V_{dc} \cdot e^{j(s_{k+1}-1)\pi/3} = V_{m(k+1)} \cdot e^{j\theta_{k+1}} = V_{rx(k+1)} + j \cdot V_{ry(k+1)}. \quad (14)$$

where $V_{dc}$ is the voltage of the DC source 110, $V_{m(k+1)}$ and $\theta_{k+1}$ are the magnitude and phase angle of the subtracted reference vector $V_{ref(k+1)}$. $V_{rx(k+1)}$ and $V_{ry(k+1)}$ are real numbers and represent the real part and imaginary part of $V_{ref(k+1)}$, respectively.

At the final step, $V_{ref(n-2)}$ 340 is determined, and $V_{ref(n-2)}$ 340 can be decomposed into two vectors as with the second-level inverter, as shown in FIG. 3B. The nearest three vectors of the reference vector 240 are the vectors $V_{01}$ 242, $V_{02}$ 244, and $V_{03}$ 246, as shown in FIG. 2B. The detailed decomposition processing of $V_{ref(n-2)}$ 340 in the present invention is described below.

The subtracted reference vector at the final step, i.e., $V_{ref(n-2)}$ 340, is called the remainder vector 340 and is signed with $V'_{ref}$ as $$V'_{ref} = V_{ref(n-2)} = V_{dc} \cdot (V_{rx} + j \cdot V_{ry}) \quad (15)$$

where $V_{rx}$ and $V_{ry}$ are real numbers and represent the real part and imaginary part of $V'_{ref}/V_{dc}$, respectively. The first vertex 244 of the modulation triangle is the center vertex 244 of the nested second-level hexagon 350 at the final step.

Figure 9A:
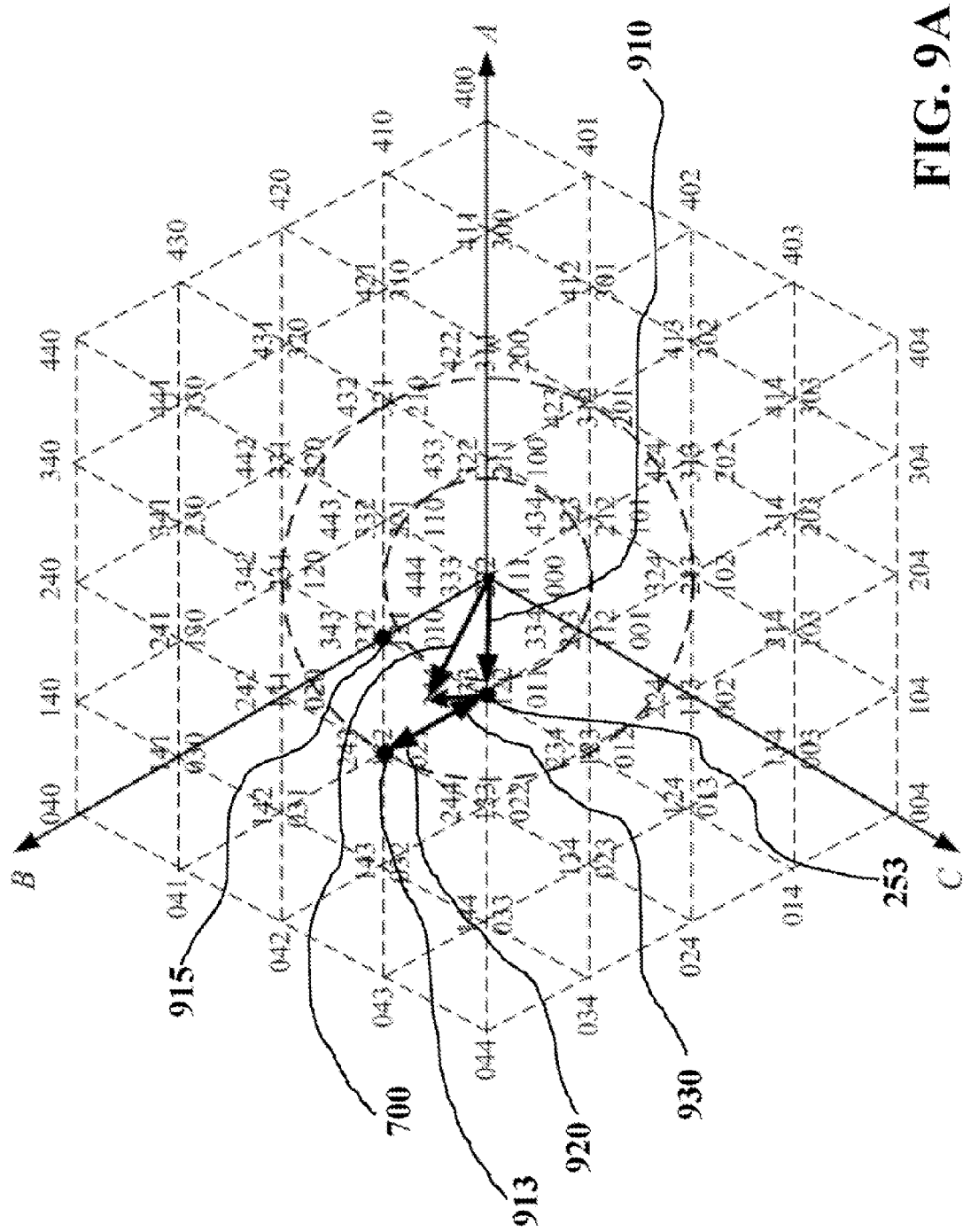
FIG. 9A is a schematic of the reference vector in the low-modulation region without applying the classification method of FIG. 7A.

FIG. 9A shows an example of the reference vector $V_{ref}$ locating in the "low-modulation region." The $V_{ref}$ still can be handled by the above-described method. For example, a reference vector $V_{f1}$ 700 is in the low-modulation region and the corresponding vertex vectors are 910, 920, and 930. The first vertex 253 of the modulation triangle of the reference vector $V_{f1}$ 700 can be determined as shown in FIG. 9A.

Figure 9B:
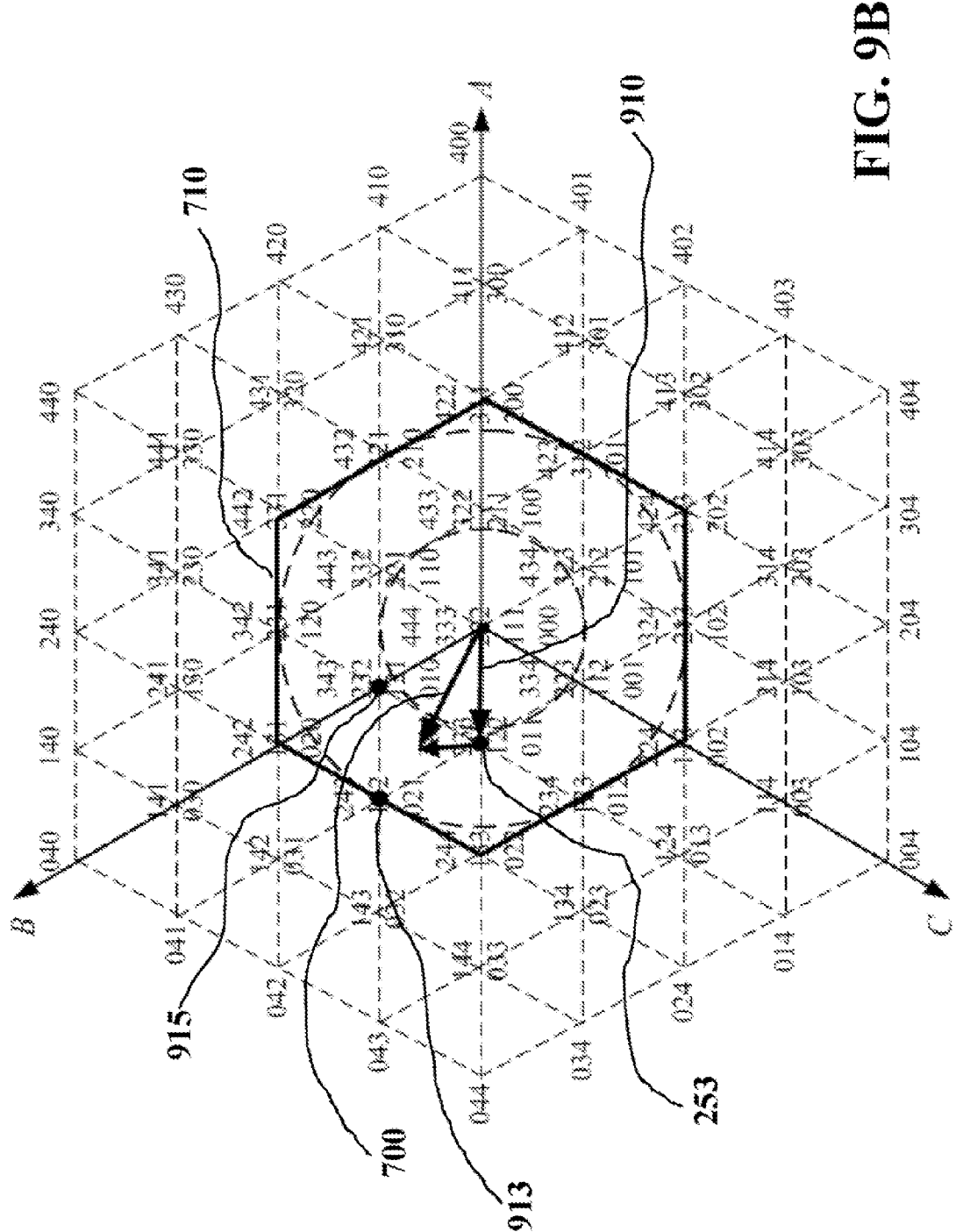
FIG. 9B is a schematic of the reference vector illustrated in FIG. 9A with applying the classification method of FIG. 7A according to some embodiments of the invention.

FIG. 9B shows an example of the method of another embodiment that handles the reference vector $V_{ref}$ locating in the "low-modulation region" in a more simplified way. According to the modulation region of the reference vector $V_{f1}$ 700 calculated in Equation (6) by the modulation region classifier 610, the reference vector $V_{f1}$ 700 is treated as in the 3-level space-vector diagram 710. The corresponding vertex vector is 910 as shown in FIG. 9B, and the number of the vertex vectors is reduced from three to one. The first vertex 253 of the modulation triangle of the reference vector $V_{f1}$ 700 is also determined by the embodiment of FIG. 9B.

Based on the first mapping of switching states, the switching states 970 at the first vertex 253 of the modulation triangle of the reference vector $V_{f1}$ 700 according to FIG. 9A and FIG. 9B can be calculated as shown in FIG. 9C and FIG. 9D, respectively. The invalid switching state −100 960 is excluded at the final step in FIG. 9C and FIG. 9D, and the switching states 970 at the first vertex 253 of the modulation triangle can be verified by being compared with the switching states at the vertex 253 shown in FIG. 2B. When the modulation region classifier 610 is not adopted and the reference vector 700 is in the low-modulation region as in FIG. 9A, the invalid switching states 950 −100, 354, and −110 for the vertices 253 and 913 of the vertex vectors 910 and 920 are not excluded during the modification shown in FIG. 9C before the final step of the modification is implemented, and the invalid switching state −100 960 is excluded at the final step where the first vertex 253 of the modulation triangle is reached. However, if the modulation region classifier 610 of the present invention is adopted, then the invalid switching states 490 454, 353, and −120 and 960 −100 can be excluded sequentially during the modification, as shown in FIG. 4B and FIG. 9D, respectively.

Because the number of both the vertex vectors and the switching states at the vertices of the vertex vectors is reduced by adopting the modulation region classifier 610 when the command reference vector $V_{ref}$ is locating in the low-modulation region, the modulation region classifier 610 decreases the processing time of the SVPWM.

Figure 10:
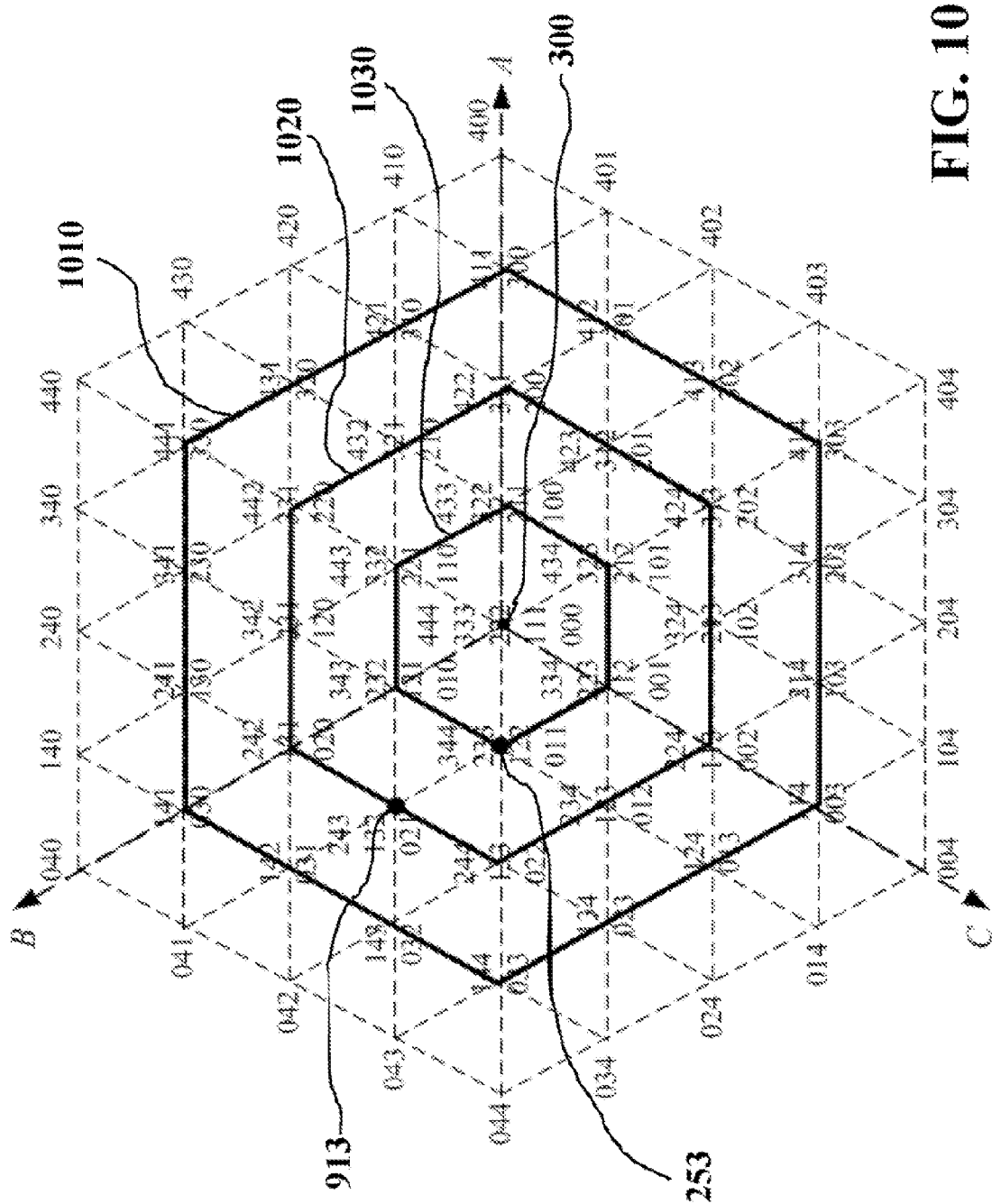
FIG. 10 is illustration of vertices of the origin of the remainder vector according to some embodiments of the invention.

FIG. 10 shows example of possible origins of the remainder vector $V'_{ref}$ as hexagons 1010, 1020, and 1030 and the center vertex 300 of the n-level space vector diagram that can be used by the modulation region classifier 610. The number of switching states at the vertices on the smaller hexagon can be larger than the number of switching states at the vertices on the bigger hexagon. For example, the vertex 253 is on the hexagon 1030 and the vertex 913 is on the bigger hexagon 1020, and the number of switching states at the vertex 253, i.e., four, is more than the number of switching states at the vertex 913, i.e., three. The reason why the invalid switching states 950 −100, 354, and −110 during the modification of switching states shown in FIG. 9C is not excluded can be explained as follows. Because the vertex vector 930 in FIG. 9A is from the vertex 913 to a vertex 253 with less switching states, i.e., the vertex vector 930 points from a bigger hexagon 1020 to smaller hexagon 1030, the valid switching state 344 980 in FIG. 9C is removed when the invalid switching state 354 950 is excluded during the modification, and thus all the switching states are retained until the final step of the modification. Because of the modulation region classifier 610, the vertex vectors of the reference vector does not point from a bigger hexagon to a smaller hexagon as the vertex vector 930 in FIG. 9A does, and the invalid switching states, e.g. 490 454, 353, and −120, can be excluded sequentially during the modification as in FIG. 4B.

The rational for the first mapping is based on Equation (14). The shift of the origin of the reference vector $V_{ref(k)}$ at the $(k+1)^{th}$ step is $V_{dc} \cdot e^{j(S_{k+1}-1)\pi/3}$, which is determined by the order number $S_{k+1}$ of the selected nested hexagon and can be substituted into Equation (1) to determine the required modification for the current switching states of phase A, B, or C.

Duty Cycles

Based on the remainder vector $V'_{ref}$, the duty cycles are determined by the duty cycles generator 630, independent of the levels the inverter. As shown in FIG. 11A, any 2-level space vector diagram contains 6 vectors, $V_1$-$V_6$, and the corresponding duty cycles of these vectors are named as $T_1$-$T_6$. In the present invention, the 2-level space vector diagram is partitioned into 6 regions by those vectors, and each region is numbered with a value named reg, reg=1, 2, ... 6. The values of vectors $V_1$-$V_6$ are $$V_{reg} = V_{dc} \cdot e^{j \cdot (reg-1) \cdot \pi/3}, reg=1,2,\ldots 6 \quad (16)$$

The selection of the vectors and the calculation of the corresponding duty cycles are done by two steps. First, determine the region containing $V'_{ref}$ as follows:

$$reg = \begin{cases} 1, & \text{if } V_{rx} > 0 \text{ and } 0 < V_{ry} \le \sqrt{3} V_{rx}; \\ 6, & \text{else if } V_{rx} > 0 \text{ and } -\sqrt{3} V_{rx} < V_{ry} \le 0; \\ 3, & \text{else if } V_{rx} < 0 \text{ and } 0 < V_{ry} \le -\sqrt{3} V_{rx}; \\ 4, & \text{else if } V_{rx} < 0 \text{ and } \sqrt{3} V_{rx} < V_{ry} \le 0; \\ 2, & \text{else if } V_{ry} > 0; \\ 5, & \text{else.} \end{cases} \quad (17)$$

And the two vectors are selected as $V_{reg}$ and $V_{reg+1}$, when reg<6. When reg=6, those two vectors are $V_6$ and $V_1$. For example, if the remainder vector $V'_{ref}$ 340 is as shown in FIG. 11A, then the region number is reg=2, and $V_2$ and $V_3$ are the selected vectors.

After the region number reg is determined, the following equation is met:

$$T_s \cdot V'_{ref} = T_{reg} \cdot V_{reg} + T_{reg+1} \cdot V_{reg+1} = V_{dc} \cdot (T_3 \cdot e^{j \cdot (reg-1) \cdot \pi/3} + T_4 \cdot e^{j \cdot reg \cdot \pi/3}) \quad (18)$$

where $T_s$ is the switching cycle and $T_s = 1/f_s$ where $f_s$ is the command switching frequency 144. When reg=6, $V_{reg+1}$ and $T_{reg+1}$ mean $V_1$ and $T_1$, respectively.

Then substitute Equation (15) into Equation (18) and the duty cycles can be determined as $$\begin{cases} T_{reg} = \frac{2}{\sqrt{3}} \left[ V_{rx} \sin\left(\frac{reg}{3}\pi\right) - V_{ry} \cos\left(\frac{reg}{3}\pi\right) \right] \cdot T_s \\ T_{reg+1} = -\frac{2}{\sqrt{3}} \left[ V_{rx} \sin\left(\frac{reg-1}{3}\pi\right) - V_{ry} \cos\left(\frac{reg-1}{3}\pi\right) \right] \cdot T_s \end{cases} \quad (19)$$

For the vectors from the center vertex 300 of the n-level space vector diagram to the first vertex 244 of the modulation triangle of the reference vector 240, or called the "zero vectors" in the present invention, their total duty cycles are $$T_0 = T_s - T_{reg} - T_{reg+1}, \quad (20)$$

where $T_s$ is the switching cycle as in Equation (18). For a multilevel inverter, there are usually no less than two switching states for the first vertex 244 of the modulation triangle, as shown in FIG. 3B. In the SVPWM method of some embodiments, two switching states, e.g., 374 142 and 372 031 as in FIG. 3B, for the first vertex 244 of the modulation triangle are used, and each switching state for the first vertex 244 of the modulation triangle represents a "zero vectors". The duty cycle of each "zero vector" can be freely adjusted as long as the following equation is met $$T_{02} = T_0 - T_{01}, 0 \le T_{01} \le T_0 \quad (21)$$

where $T_{01}$ is the duty cycle of a first zero vector 374, named $V_{01}$, and $T_{02}$ is the duty cycle of a second zero vector 372, named $V_{02}$. Because different zero vectors can have different influence in the voltages of the DC link capacitors 112, 114, 116, and 118, the voltage balance of the DC link capacitors 112, 114, 116, and 118 can be controlled by tuning the $T_{01}$ or $T_{02}$ in Equation (21).

Switching Sequence

Figure 11B:
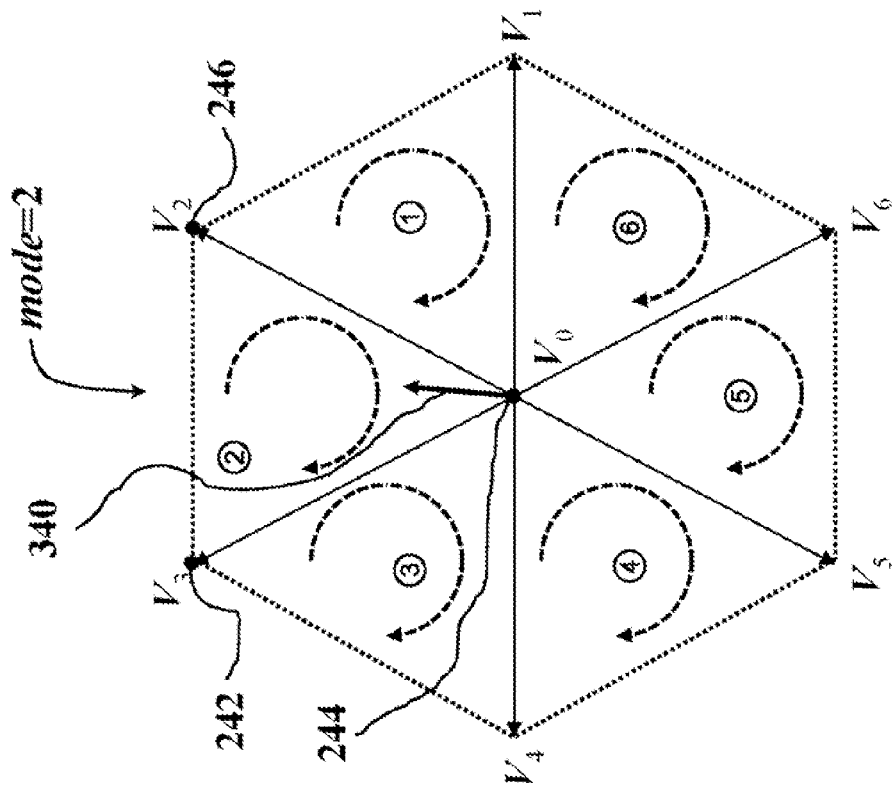
FIG. 11A-11B are illustration of switching sequence modes according to some embodiments of the invention.
Figure 11A:
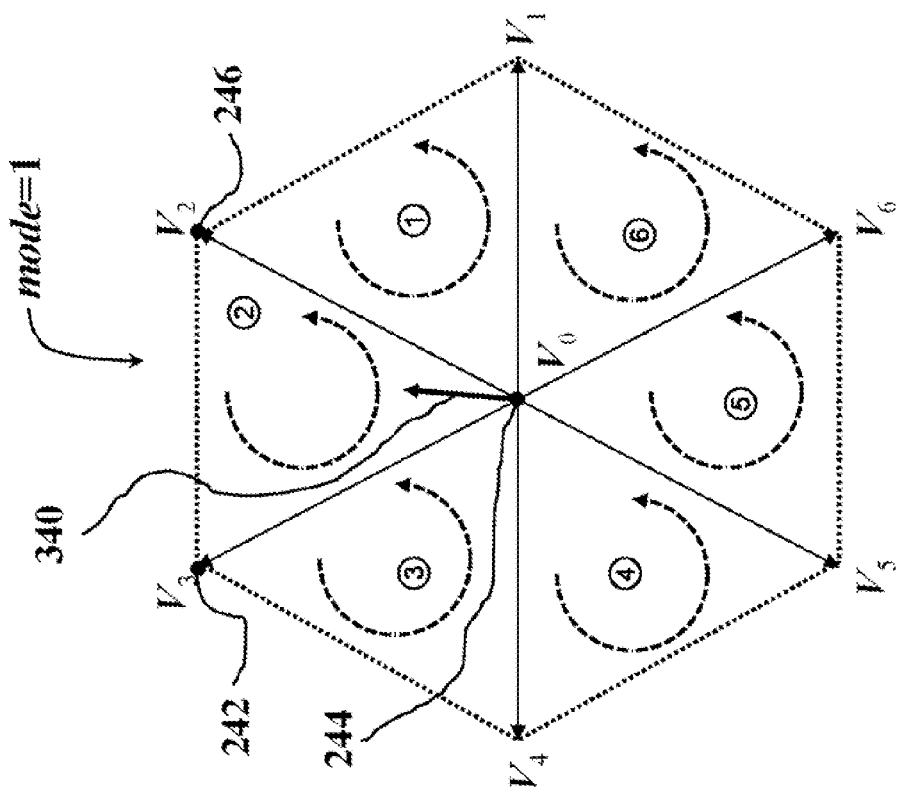

FIGS. 11A-B show illustration of two switching sequence modes used by some embodiments of the invention. FIG. 11A shows an example where mode=1 and the switching sequence is counterclockwise selected. FIG. 11B shows an example where mode=2 and the switching sequence is clockwise selected. Based on the second mapping, as shown in FIG. 5A, the value of reg and the value of mode, the switching sequence can be determined by the switching sequence generator 640.

The switching sequence according to switching sequence mode mode=1 is shown in FIG. 11C, and the switching sequence according to mode=2 is shown in FIG. 11D. The switching state for each vector $V_{01}$ 390, $V_{reg}$ 246, $V_{reg+1}$ 242, or $V_{02}$ 380 is shown below the corresponding vector, e.g., $S_{a01}S_{b01}S_{c01}$ 1100 is the switching state for vector $V_{01}$ 390, which means the switching state of phase A, B, and C is $S_{a01}$, $S_{b01}$, and $S_{c01}$, respectively.

Take "ABC↑(L)" when reg=1 and mode=1 as an example to explain the switching sequence selection method in the present invention. Because reg=1, the vectors of the first sector, i.e., the vectors $V_1$ and $V_2$ are selected, and because mode=1, the switching sequence is $V_0 \rightarrow V_1 \rightarrow V_2 \rightarrow V_0$. From $V_0$ to $V_1$, the change of the vector is $V_{dc}$, which can be substituted into Equation (1) and means that the switching state of phase A increases by one. From $V_1$ to $V_2$, the change of the vector is $V_{dc} \cdot e^{j2\pi/3}$, which can be substituted into Equation (1) and means that the switching state of phase B increases by one. Similarly, from $V_2$ to $V_0$, the change of the vector is $V_{dc} \cdot e^{j4\pi/3}$, which means the switching state of phase C increases by one. All the switching sequences for other values of reg and mode can be analyzed in the similar way, and the rule of determining the switching sequence can be mapped as the second mapping.

Such mapping simplifies the determination of the switching states during the operation of the inverter, and can be used by inverter of any level, and for reference vector of any region. For example, if the reference vector $V_{ref}$ 1210 is located in the low-modulation region as shown in FIG. 12A, and 1220 and 1230 are the vertex vectors and 1240 is the remainder vector with the region number reg=5, then the switching sequence can be calculated as shown in FIG. 12B, which can be verified by being compared with the space vector diagram shown in FIG. 12A.

The rule of determining the switching sequence represented by the second mapping can also be extended to produce the switching sequence for other specific requirements. For example, in some applications, the switching sequence is preferred to be symmetric. In other words, if the original switching sequence is $V_0 \rightarrow V_1 \rightarrow V_2 \rightarrow V_0$, then the preferred switching sequence is $V_0 \rightarrow V_1 \rightarrow V_2 \rightarrow V_0 \rightarrow V_2 \rightarrow V_1 \rightarrow V_0$. The extended rule of determining the switching sequence for these applications is summarized in FIG. 13A, in which each element of the rule of determining the switching sequence is actually a combination of the two elements of the rule summarized in FIG. 5A according to the corresponding region number reg of the remainder vector. For example, when reg=1 and mode=1, the rule of determining the switching sequence is "ABC↑CBA↓(L)". As explained for the rule of determining the switching sequence shown in FIG. 5A, the letter "L" means the first switching state at the first vertex of the modulation triangle is not the top one; the next first three sequential switching states is generated according to the rule "ABC↑" as in FIG. 5A when reg=1 and mode=1, and the next second three sequential switching states is generated according to the rule "CBA↓" as in FIG. 5A when reg=1 and mode=2. Based on the rule of determining the switching sequence shown in FIG. 13A in the present invention, the switching sequences of the reference vector $V_{ref}$ 1210 shown in FIG. 12A according to different switching sequence modes are shown in FIG. 13B, and the switching sequences can be verified by being compared with the space vector diagram shown in FIG. 12A.

Figure 12A:
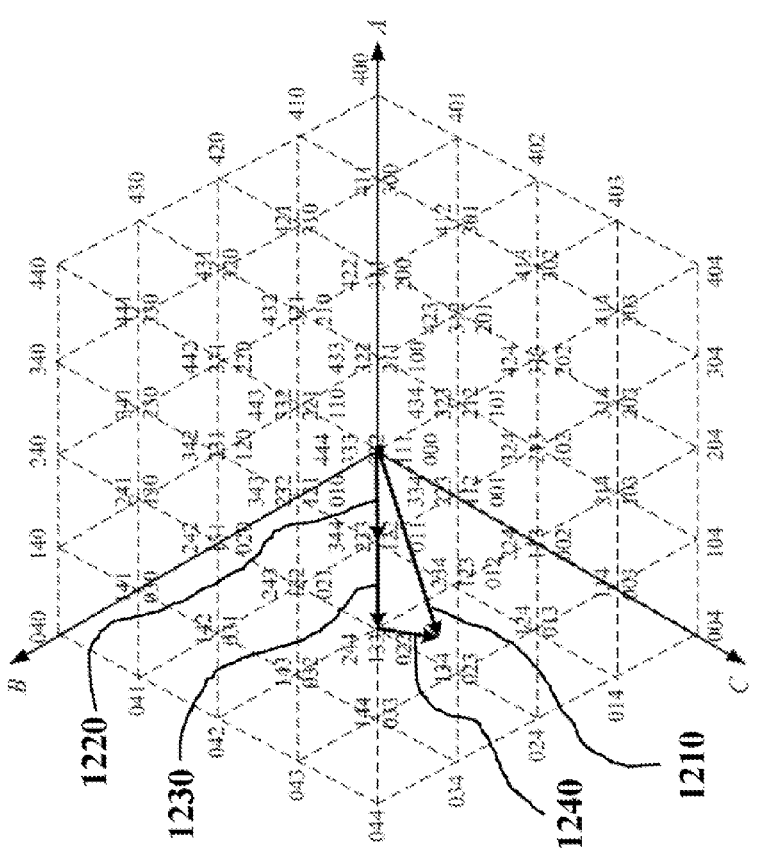
FIG. 12A is an example of a reference vector in the low-modulation region according to some embodiments of the invention.
Figure 12B:
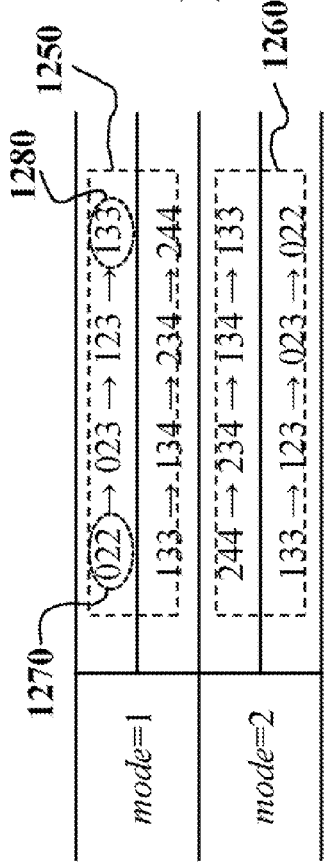
FIG. 12B is an illustration of applying the switching sequence selection method shown in FIG. 5A to generate the switching sequence of the reference vector illustrated in FIG. 12A according to some embodiments of the invention.

It can be seen from FIG. 12B and FIG. 13B that many switching sequences can be selected for some reference vectors, e.g., for the reference vector 1210 shown in FIG. 12A. Since different switching sequences can have different influence in the voltages of the DC link capacitors 112, 114, 116, and 118, the voltage balance of the DC link capacitors 112, 114, 116, and 118 can be controlled by selecting the appropriate switching sequences in the present invention.

DC-Link Voltage Balancing Control

The voltage drift of the DC-link capacitors 112, 114, 116, and 118 of the inverter 120 can reduce the control accuracy of SVPWM and thus degrade the performance of the inverter, in terms of higher voltage pressure on the power devices, higher harmonics, higher electromagnetic interference. If the voltage drift of the DC-link capacitors is not limited during the operation of the inverter, then the unbalances of DC-link capacitor voltages can even lead to the collapse of some of these voltages under a wide range of operating conditions.

Figure 14:
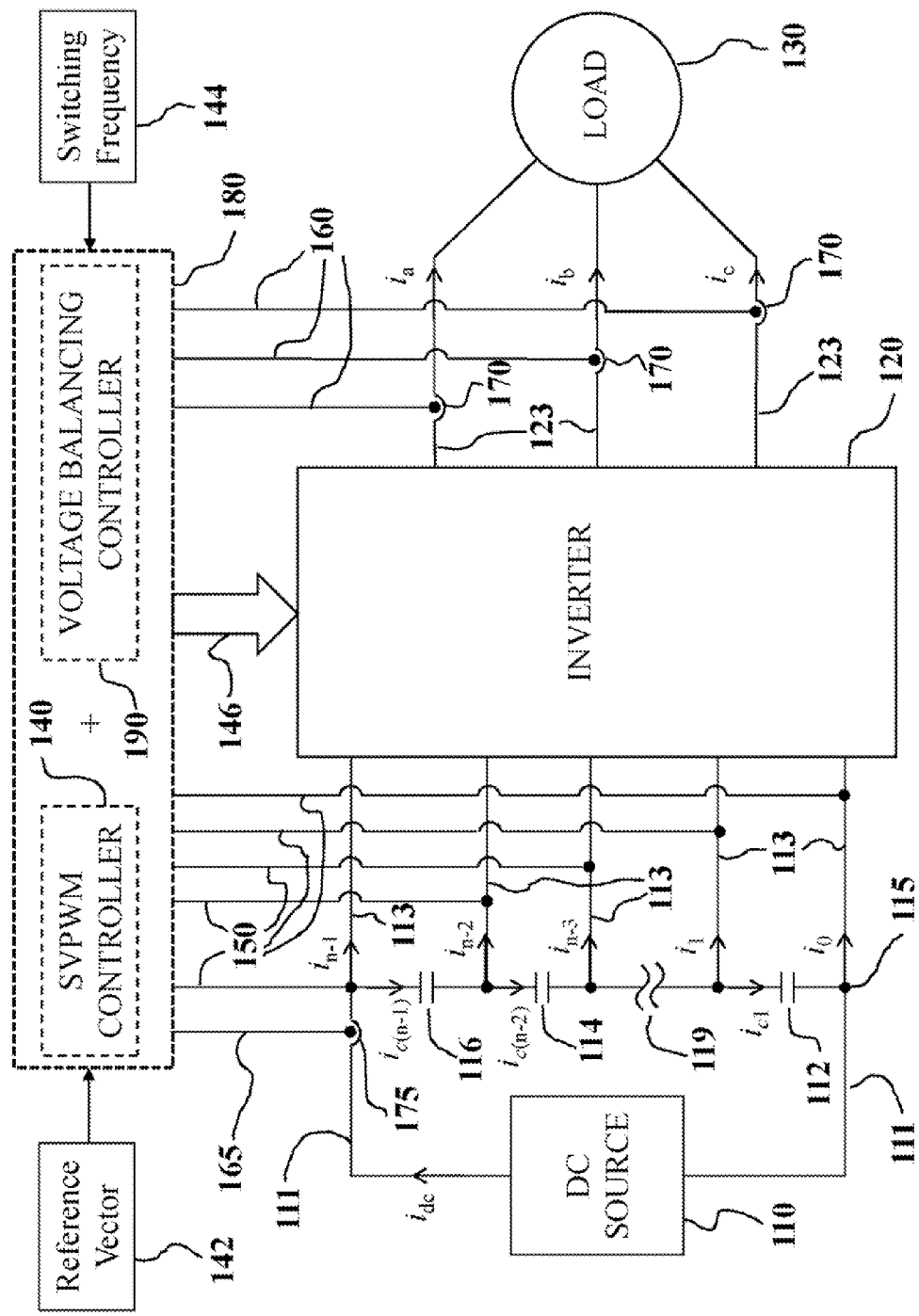
FIG. 14 is a block diagram of a multilevel inverter considering DC-link voltage balancing control according to some embodiments of the invention.

FIG. 14 shows an example of a multilevel inverter according to some embodiments of the invention. Compared with the block diagram in FIG. 1, the controller 180 in FIG. 14 receives some extra measured parameters, e.g., parameters 1510 of FIG. 15. The parameters can include voltages of the DC-link capacitors 112, 114, 116, and 119 on sensing lines 150, the signals on lines 160 from current sensors 170 which sense the output currents of the inverter 120 on the output lines 123, and the signals on line 165 from current sensor 175 which senses the output current of the DC source 110 on the input lines 111. The gate driving signals 146 of the inverter 120 are produced by the controller 180 according to a command reference voltage 142, a command switching frequency 144, the voltage signals of the DC-link capacitors 112, 114, 116, and 119 on sensing lines 150, the output current signal of the DC source 110 on line 165, and the output current signals of the inverter 120 on lines 160. In this example, the controller 180 comprises two elements, i.e., the SVPWM controller 140 and the voltage balancing controller 190. The SVPWM controller 140 generates the switching sequence 645 and the corresponding duty cycles 632 as in FIG. 6, and the voltage balancing controller 190 implements the DC-link voltage balancing control.

Figure 15:
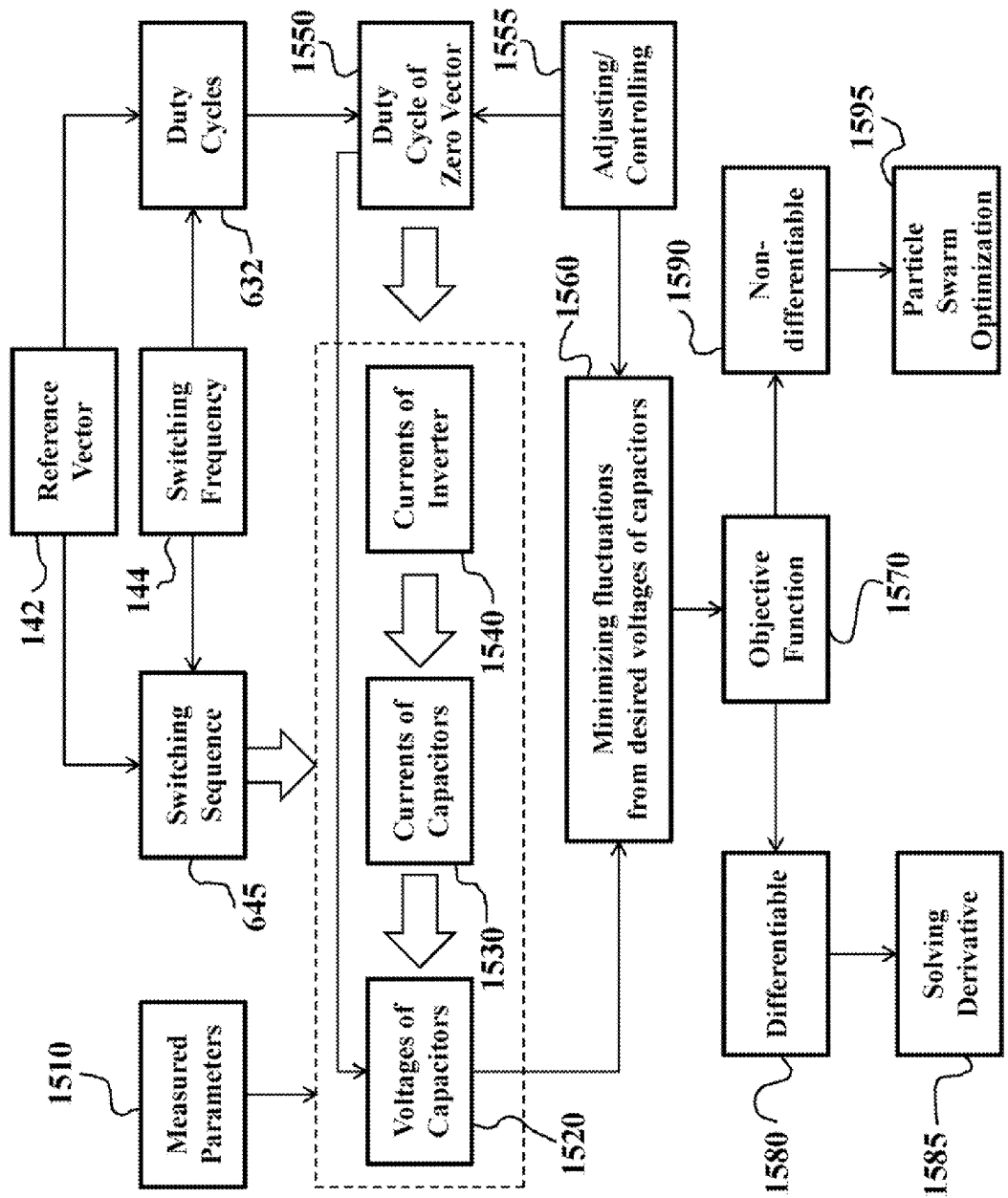
FIGS. 15-16 are block diagrams of example DC-link voltage balancing methods according to some embodiments of the invention.

FIG. 15 shows an example of the DC-link voltage balancing control in the present invention according to a certain switching sequence 645. The voltages 1520 of the DC-link capacitors 112, 114, 116, and 119 can be controlled by controlling the currents 1530 of the DC-link capacitors. The currents of the DC-link capacitors can be controlled by controlling the input currents 1540 of the inverter 120 on input lines 113. The input currents of the inverter 120 are determined by the output currents 1540 of the inveter 120 on output lines 123 and the three-phase switching states, e.g., 1100, of the inverter 120. Consequently, for a certain switching sequence 645, the fluctuations of the voltages of the DC-link capacitors 112, 114, 116, and 119 can be controlled by 1555 adjusting the corresponding duty cycles 632. For a certain reference voltage 142, the corresponding duty cycles 632 can be determined as in Equation (19) and Equation (20), so only 1550 a duty cycle of a zero vector $T_{01}$ or $T_{02}$ can be adjusted as in Equation (21) to control the fluctuations of the voltages of the DC-link capacitors.

One of the objectives of DC-link voltage balancing control is 1560 minimizing the fluctuations of the voltages of the DC-link capacitors 112, 114, 116, and 119 from desired voltages, e.g., $V_{dc}/(n-1)$, of the DC-link capacitors. This objective can be achieved by minimizing an objective function 1570, which represents a difference between the desired voltages of the DC-link capacitors and the expected voltages 1520 of the DC-link capacitors, and is a function of 1550 the duty cycle of the zero vector for a certain switching sequence 645. If the objective function 1570 is differentiable 1580, then the optimal 1550 duty cycle of the zero vector can be obtained by 1585 solving the derivative of the objective function; if the objective function 1570 is non-differentiable 1590, then the optimal 1550 duty cycle of the zero vector can be obtained by some optimization methods, e.g., particle swarm optimization 1595.

Figure 16:
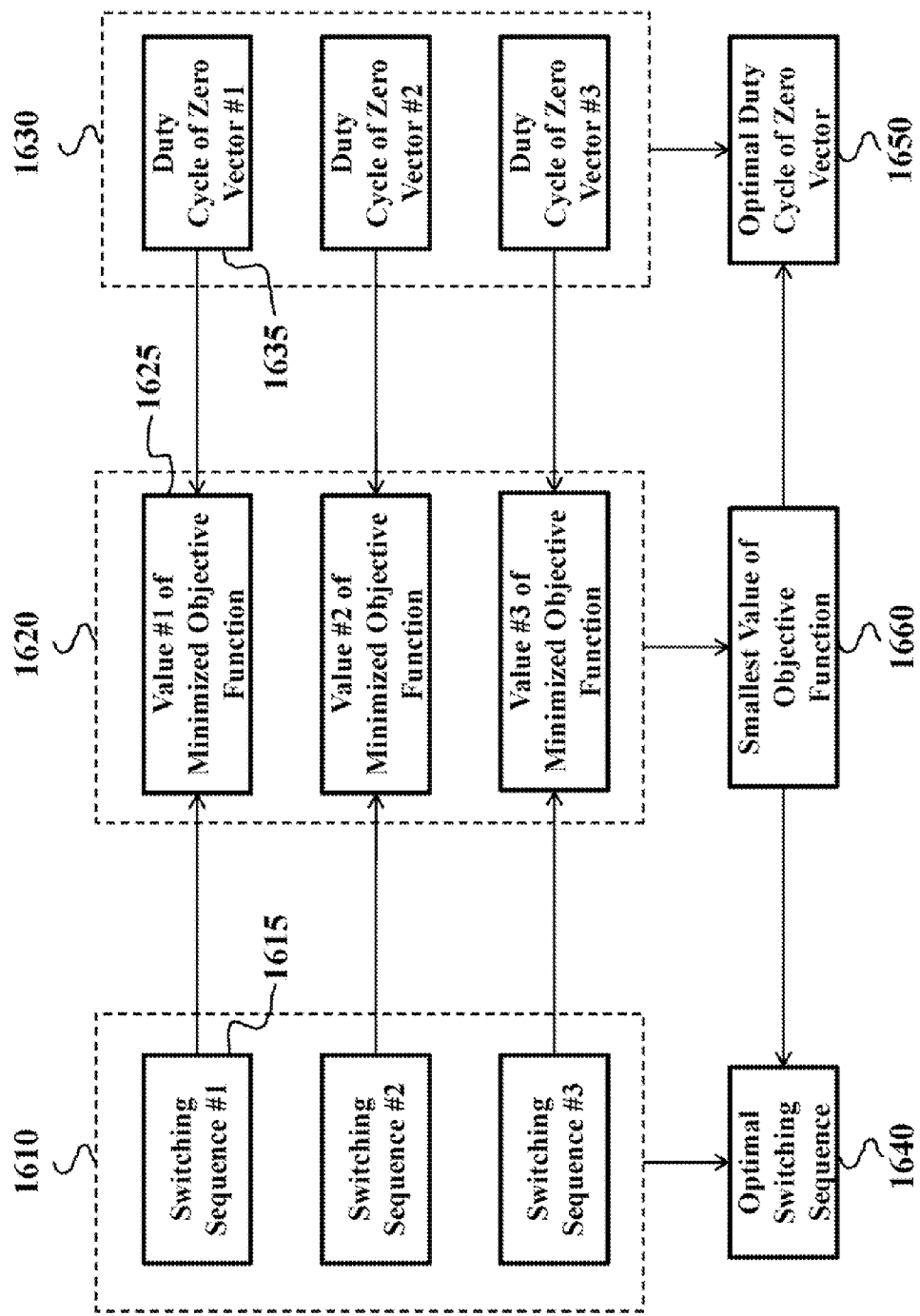

FIG. 16 shows an example of the DC-link voltage balancing control according to some embodiments of the invention. A set of switching sequences 1610 is generated by the SVPWM controller 140 for various duty cycles. For example, the reference voltage 142 can be located in low-modulation region as 1210 in FIG. 12A-B. Only three switching sequences are shown in FIG. 16 for illustration purposes. For each switching sequence, e.g., 1615, in the set 1610, the optimal duty cycle of the zero vector 1635 and the minimized objective function 1625 are determined as in FIG. 15. Consequently, according to the set of switching sequences 1610, a set of duty cycles of the zero vector 1630 and a set of minimized objective function 1620 are determined. Next, the smallest value of the objective function 1660 is selected from the set of minimized objective function 1620, and accordingly the optimal switching sequence 1640 is selected from the set of switching sequences 1610 and the corresponding optimal duty cycle of the zero vector 1650 is selected from the set of duty cycles of the zero vector 1630.

Figure 17:
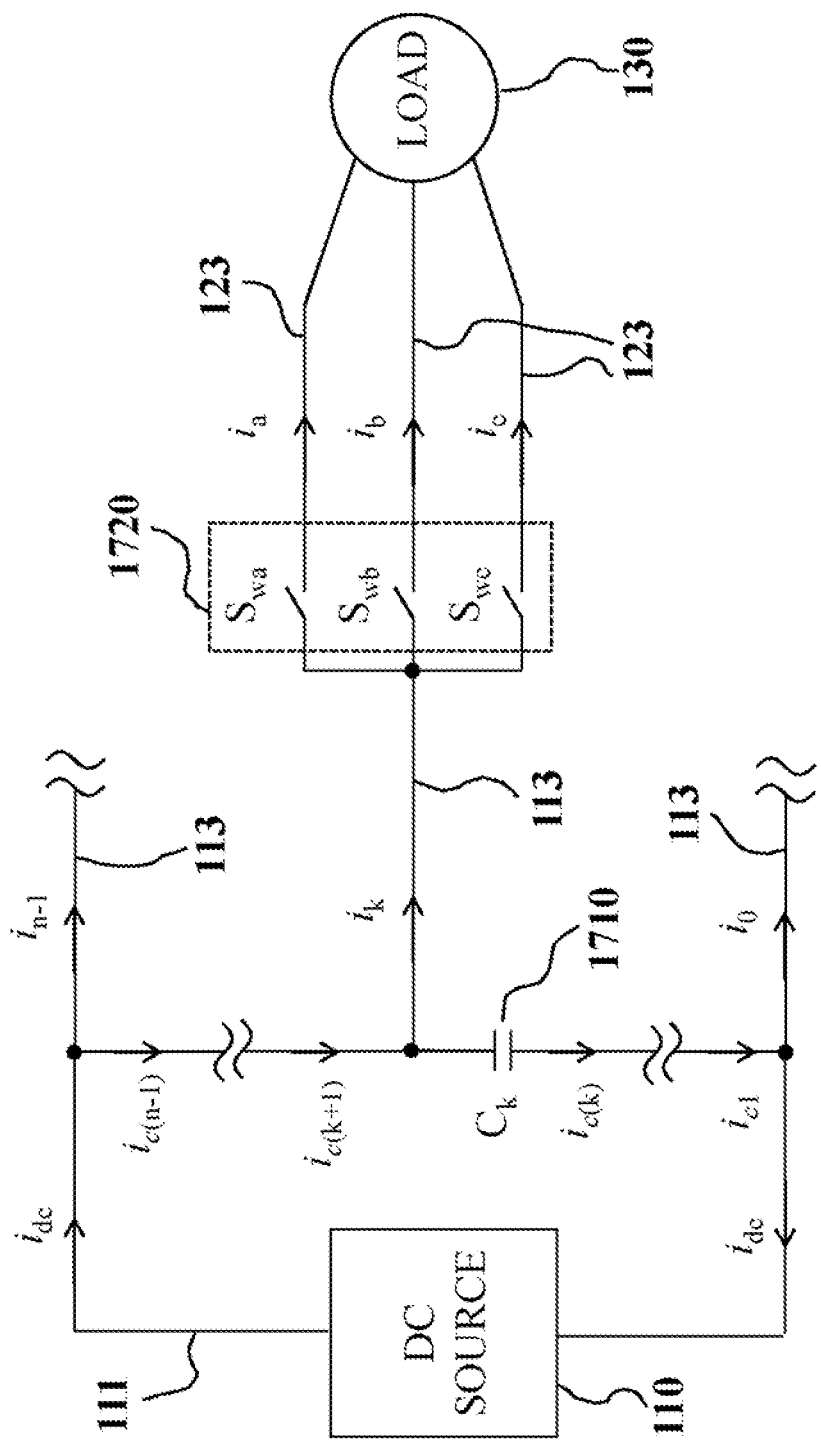
FIG. 17 is a schematic of relationship between the currents of the multilevel inverter illustrated in FIG. 14.

FIG. 17 shows an example of determining the currents and thus voltages of the DC-link capacitors 112, 114, 116, and 119. Based on the voltage signals of the DC-link capacitors on sensing lines 150, the voltages of the DC-link capacitors are obtained. Name the voltages of the DC-link capacitors at a sampling time $t_0$ from bottom to top as $v_1, v_2, \ldots v_{n-1}$, then the expected voltage, i.e., the voltage at a start of the next switching cycle after a switching cycle $T_s$, of the $k^{th}$ capacitor $C_k$ 1710, k=1, 2, ... n−1, is $$v'_k = v_k + \bar{i}_{c(k)} \cdot T_s / C_k \qquad (22)$$

where $i_{c(k)}$ is the instantaneous current of the capacitor $C_k$ 1710, and $\bar{i}_{c(k)}$ is the average value of $i_{c(k)}$ during one switching cycle as $$\bar{i}_{c(k)} = \frac{1}{T_s} \int_{i_0}^{i_0+T_s} i_c(k)\, dt \qquad (23)$$

From Equation (22) and Equation (23) it can be seen that the voltages of the DC-link capacitors 112, 114, 116, and 119 can be controlled by controlling the currents of the DC-link capacitors.

In some prior DC-link voltage balancing schemes, the currents of the DC-link capacitors 112, 114, 116, and 119 are obtained by assuming the following equation $$\sum_{k=1}^{n-1} i_{c(k)} = \sum_{k=1}^{n-1} \frac{1}{c_k} \frac{dv_k}{dt} = \frac{1}{c}\sum_{k=1}^{n-1} \frac{dv_k}{dt} = \frac{1}{c} \frac{dV_{dc}}{dt} = 0 \qquad (24)$$

where $V_{dc}$ is voltage of the DC source 110. However, Equation (24) is accurate only when all the capacitances of the DC-link capacitors 112, 114, 116, and 119 are strictly equal to C and the voltage of the DC source 110 has no fluctuation, which can't be guaranteed in practical applications. In the present invention, the output current of the DC source 110 is sensed by the current sensor 175 and is sent to the controller 140 by line 165, so Equation (24) is not needed in the present invention, which makes sure the accuracy of the DC-link voltage balancing control in the present invention even when the capacitances of the DC-link capacitors are not strictly equal or the voltage of the DC source 110 has fluctuation.

The currents of the DC-link capacitors 112, 114, 116, and 119 are determined by the input currents $i_0, i_1, i_2, \ldots i_{n-1}$ of the inverter 120 on the input lines 113 and the output current $i_{dc}$ of the DC source 110 on the lines 111, as shown in FIG. 14 and FIG. 17. The relationship is $$i_{c1} = i_0 + i_{dc} \qquad (25)$$

and $$i_{c(k+1)} = i_{c(k)} + i_k \qquad (26)$$

where k=1, 2, ... n−2. Based on Equation (25) and Equation (26), the currents of the DC-link capacitors 112, 114, 116, and 119 are obtained as $$i_{c(k)} = \sum_{m=0}^{k-1} i_m + i_{dc} \qquad (27)$$

where k=1, 2, ... n−1.

As shown in FIG. 17, the input currents $i_0, i_1, i_2, \ldots i_{n-1}$ of the inverter 120 on the lines 113 are determined by the output currents $i_a, i_b$, and $i_c$ of the inverter 120 on lines 123 as $$i_k = \delta(S_a - k) \cdot i_a + \delta(S_b - k) \cdot i_b + \delta(S_c - k) \cdot i_c \qquad (28)$$

where k=0, 1, 2, ... n−1, and $\delta(\neq 0)=0, \delta(0)=1$. The "switches" 1720 $S_{wa}, S_{wb}$, and $S_{wc}$ in FIG. 17 are closed only when the switching state of the corresponding phase is equal to k. Assume the output currents $i_a, i_b$, and $i_c$ of the inverter 120 are constant during a switching cycle, then the average of the currents $i_0, i_1, i_2, \ldots i_{n-1}$ on the lines 113 according to the switching sequences shown in FIG. 11C and FIG. 11D are calculated by Equation (28) and Equation (19)-(21) in the present invention as $$\bar{i}_k = \frac{1}{T_s} \left\{ \begin{array}{l} [\delta(S_{a01}-k) \cdot i_a + \delta(S_{b01}-k) \cdot i_b + \delta(S_{c01}-k) \cdot i_c] \cdot T_{01} + \\ [\delta(S_{a1}-k) \cdot i_a + \delta(S_{b1}-k) \cdot i_b + \delta(S_{c1}-k) \cdot i_c] \cdot T_{reg} + \\ [\delta(S_{a2}-k) \cdot i_a + \delta(S_{b2}-k) \cdot i_b + \delta(S_{c2}-k) \cdot i_c] \cdot T_{reg+1} + \\ [\delta(S_{a02}-k) \cdot i_a + \delta(S_{b02}-k) \cdot i_b + \delta(S_{c02}-k) \cdot i_c] \cdot T_{02} \end{array} \right\} \qquad (29)$$

$$= \beta_{1(k)} \cdot T_{01} + \beta_{2(k)}$$

where $\beta_{1(k)}$ and $\beta_{2(k)}$ are constants according to a certain switching sequence, i.e., the switching states for the vectors $V_{01}$ 374, $V_{reg}$ 246, $V_{reg+1}$ 242, and $V_{02}$ 372 shown in FIG. 11C and FIG. 11D, and $$\begin{cases} \beta_{1(k)} = \frac{1}{T_s} \left\{ \begin{array}{l} [\delta(S_{a01}-k) - \delta(S_{a02}-k)] \cdot i_a + \\ [\delta(S_{b01}-k) - \delta(S_{b02}-k)] \cdot i_b + \\ [\delta(S_{c01}-k) - \delta(S_{c02}-k)] \cdot i_c \end{array} \right\} \\ \beta_{2(k)} = \frac{1}{T_s} \left\{ \begin{array}{l} [\delta(S_{a1}-k) \cdot i_a + \delta(S_{b1}-k) \cdot i_b + \delta(S_{c1}-k) \cdot i_c] \cdot T_{reg} + \\ [\delta(S_{a2}-k) \cdot i_a + \delta(S_{b2}-k) \cdot i_b + \delta(S_{c2}-k) \cdot i_c] T_{reg+1} + \\ [\delta(S_{a02}-k) \cdot i_a + \delta(S_{b02}-k) \cdot i_b + \delta(S_{c02}-k) \cdot i_c] \cdot T_0 \end{array} \right\} \end{cases} \qquad (30)$$

where k=0, 1, 2, ... n−1, and the values of $T_0, T_{reg}$, and $T_{reg+1}$ are in Equation (19) and Equation (20).

Substitute Equation (29) to Equation (27) and assume the output currents $i_{dc}$ of the DC source 110 is constant during a switching cycle, then the average currents of the DC-link capacitors 112, 114, 116, and 119 in the present invention are $$\bar{i}_{c(k)} = \sum_{m=0}^{k-1} \bar{i}_m + i_{dc} = \sum_{m=0}^{k-1}(\beta_{1(m)} \cdot T_{01} + \beta_{2(m)}) + i_{dc} \qquad (31)$$

where k=1, 2, ... n−1. Substitute Equation (31) to Equation (22), then the expected voltage of the $k^{th}$ capacitor $C_k$ 1710, k=1, 2, ... n−1, after a switching cycle $T_s$ is obtained in the present invention as $$v'_k = \alpha_{1(k)} \cdot T_{01} + \alpha_{2(k)} \qquad (32)$$

where k=1, 2, ... n−1, and $\alpha_{1(k)}$ and $\alpha_{2(k)}$ are constants, and $$\begin{cases} \alpha_{1(k)} = \dfrac{T_s}{c_k} \sum_{m=0}^{k-1} \beta_{1(m)} \\ \alpha_{2(k)} = v_k + \dfrac{T_s}{c_k} \sum_{m=0}^{k-1} \beta_{2(m)} + \dfrac{T_s}{c_k} i_{dc} \end{cases} \quad (33)$$

where the value of constants $\beta_{1(m)}$ and $\rho_{2(m)}$, m=0, 1, ... k−1, are in Equation (30). From Equation (28)-(32) it can be clearly seen that for a certain command reference voltage 142, the voltages of the DC-link capacitors 112, 114, 116, and 119 can be controlled by adjusting the value of 1550 a duty cycle of a zero vector $T_{01}$ and the switching sequence 645, i.e., the switching states for the vectors $V_{01}$ 374, $V_{reg}$ 246, $V_{reg+1}$ 242, and $V_{02}$ 372 shown in FIG. 11C and FIG. 11D, in the present invention.

The DC-link voltage balancing control for an n-level inverter 1560 minimizes the fluctuations of the voltages of the DC-link capacitors 112, 114, 116, and 119 from the desired voltages, e.g., $V_{dc}/(n-1)$, after a switching cycle $T_s$, which can be achieved by minimizing an objective function 1570. Some embodiments use the objective functions are as follows $$\begin{cases} J_1 = \sum_{k=1}^{n-1} \sigma_k \left( v'_k - \dfrac{v_{dc}}{n-1} \right)^2 \\ J_2 = \sum_{k=1}^{n-1} \sigma_k \left| v'_k - \dfrac{v_{dc}}{n-1} \right| \\ J_3 = \max_{k=1,2,...n-1} \left\{ \sigma_k \left| v'_k - \dfrac{v_{dc}}{n-1} \right| \right\} \end{cases} \quad (34)$$

where $\sigma_k > 0$ (k=1, 2, ... n−1) is a weighting factor and can be selected as $\sigma_k=1$; $v'_k$ is the expected voltage of the $k^{th}$ capacitor $C_k$ 1710 after a switching cycle $T_s$ as in Equation (32); "max { }" means the maximum among the values in the set "{ }".

When the objective function is differentiable 1580 as $J_1$ in Equation (34), the value of the optimal 1550 duty cycle of the zero vector $T_{01}$ according to a certain switching sequence 645, i.e., the switching states for the vectors $V_{01}$ 374, $V_{reg}$ 246, $V_{reg+1}$ 242, and $V_{02}$ 372 shown in FIG. 11C and FIG. 11D, can be obtained by 1585 solving the derivative of the objective function, because the value of $v'_k$ is determined by $T_{01}$ as in Equation (32) for a certain switching sequence 645, as $$\dfrac{dJ_1}{dT_{01}} = \sum_{k=1}^{n-1} 2\sigma_k \left( v'_k - \dfrac{v_{dc}}{n-1} \right) \dfrac{dv'_k}{dT_{01}} = \sum_{k=1}^{n-1} 2\sigma_k \left( v'_k - \dfrac{v_{dc}}{n-1} \right) \alpha_{1(k)} = \\ \sum_{k=1}^{n-1} 2\sigma_k \left( \alpha_{1(k)} \cdot T_{01} + \alpha_{2(k)} - \dfrac{v_{dc}}{n-1} \right) \alpha_{1(k)} = 0 \quad (35)$$

where $\alpha_{1(k)}$ and $\alpha_{2(k)}$ are constants as in Equation (33). From Equation (35), the optimal $T_{01}$ according to the certain switching sequence 645 is obtained in the present invention as $$T_{opt} = -\dfrac{\sum_{k=1}^{n-1} \sigma_k \left( a_{2(k)} - \dfrac{v_{dc}}{n-1} \right) \alpha_{1(k)}}{\sum_{k=1}^{n-1} \sigma_k a_{1(k)}^2} \quad (36)$$

Considering a feasible value of $T_{01}$ is required to be $0 \le T_{01} \le T_0$, the optimal $T_{01}$ according to the certain switching sequence 645 in the present invention is $$T_{01} = \begin{cases} T_{opt}, \text{ if } (0 \le T_{opt} \le T_0); \\ 0, \text{ if } (T_{opt} < 0); \\ T_0, \text{ if } (T_{opt} > T_0). \end{cases} \quad (37)$$

where the values of $T_{opt}$ and $T_0$ are in Equation (36) and Equation (20), respectively.

If there are more than one available switching sequence 1610 generated by the SVPWM controller 140, e.g., when the reference voltage 142 locates in low-modulation region as 1210 in FIG. 12A-B, then the optimal switching sequence 1640 and the corresponding optimal duty cycle of zero vector 1650 are obtained as shown in FIG. 16 in some embodiments.

When the objective function is non-differentiable 1590 as $J_2$ or $J_3$ in Equation (34), the value of the optimal 1550 duty cycle of the zero vector $T_{01}$ can't be obtained from the derivative of the objective function as in Equation (35) because Equation (35) is non-existent for a non-differentiable objective function. Moreover, when there are more than one available switching sequence generated by the SVPWM controller 140, the derivative of the objective function as in Equation (35) needs to be calculated for every available switching sequence in order to obtain the optimal switching sequence and the corresponding duty cycles, which will slow down the calculation speed of the DC-link voltage balancing scheme. For example, when the reference voltage 142 locates in low-modulation region as 1210 in FIG. 12A-B, there will be two available switching sequences generated by the SVPWM controller 140 for each switching sequence mode shown in FIG. 12B as 1250 when the switching sequence mode is mode=1 and as 1260 when the switching sequence mode is mode=2, and the derivative of the objective function as in Equation (35) needs to be calculated twice for every switching cycle.

In some embodiments, particle swarm optimization (PSO) 1595 is applied to deal with any objective functions, i.e., both differentiable and non-differentiable. Because PSO doesn't need to calculate the derivative of the objective function, PSO can work well when the objective function is non-differentiable and reduce the computation when there are many switching sequences generated by the SVPWM controller 140. Assume the command reference voltage is 1210 as shown in FIG. 12A and the default switching sequence mode is mode=1, then all the available switching sequences generated by the SVPWM controller 140 is 1250 as shown in FIG. 12B. Let the number of all the available switching sequences be $N_s$, e.g., $N_s=2$ for 1250, and assign an order number to every available switching sequence in the set of all the available switching sequences 1250, e.g., the available switching sequences can be numbered from 1 to $N_s$ and accordingly the available switching sequences in 1250 can be numbered as 1 and 2 since $N_s=2$ for 1250. In some embodiments, PSO is used to select the optimal switching sequence 1640, i.e., the order number $N_p$ of the switching sequence producing 1660 the smallest value of the objective function J such as $J_1$, $J_2$, or $J_3$ in Equation (34), from the set of switching sequences 1610 and to calculate the corresponding optimal duty cycle $T_{01}$ 1650 in Equation (32).

A potential solution for minimizing the objective function J is called a "particle". In some embodiments, the "position" of a particle can be represented as $$x_i = [N_{p(i)}, T_{01(i)}] \quad (38)$$

where $N_{p(i)}$ is the order number of the optimal switching sequence 1640, $T_{01(i)}$ is the corresponding duty cycle $T_{01}$ 1650 in Equation (32), and i=1, 2, ... N, where N is the number of particles. If the switching sequences are numbered from 1 to $N_s$, then a feasible "position" in Equation (38) for each particle needs to meet the following requirements $$\begin{cases} 1 \le N_{p(i)} \le N_s \\ 0 \le T_{01(i)} \le T_0 \end{cases} \quad (39)$$

where $N_s$ is the total number of all the available switching sequences in the set of switching sequences 1610, and $T_0$ is the same as in Equation (20).

Figures 18A, 18B:
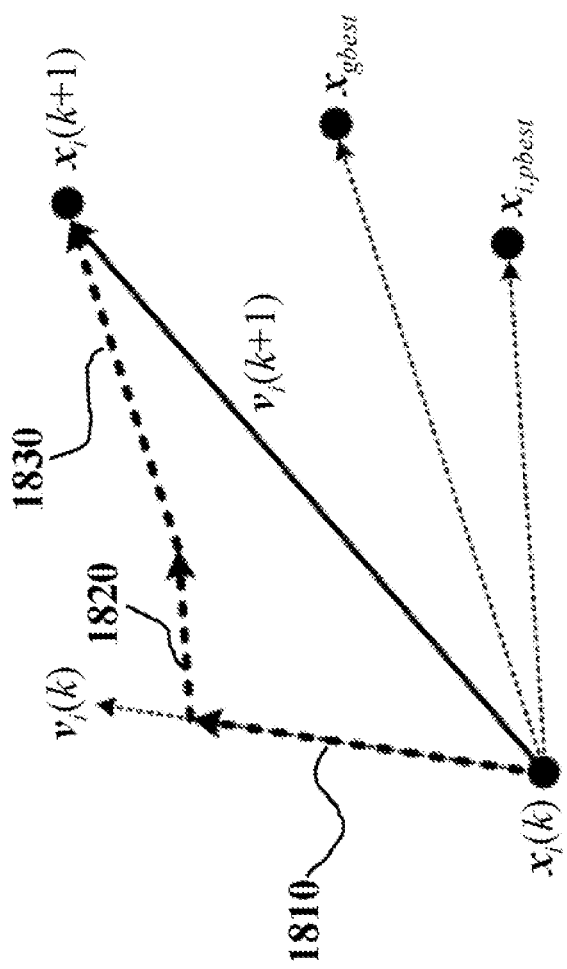
FIGS. 18A-B is a schematic of a method for updating "position" and "velocity" for each particle during particle swarm optimization.

Each particle is updated in the following way as shown in FIG. 18A

$$x_i(k+1) = x_i(k) + v_i(k+1) \quad (40)$$

where $x_i(k+1)$ and $x_i(k)$ are the values of $x_i$ at the $(k+1)^{th}$ and $k^{th}$ iteration, k=1, 2, ... iter, where iter means the maximum iteration, and $v_i(k+1)$ is called "velocity" for $x_i$ at the $(k+1)^{th}$ iteration and is stochastically adjusted in the following way as shown in FIG. 18A and FIG. 18B

$$v_i(k+1) = w \cdot v_i(k) + c_1 \phi_1 \cdot [x_{i,pbest}(k) - x_i(k)] + c_2 \phi_2 \cdot [x_{gbest}(k) - x_i(k)] \quad (41)$$

where w is called "inertia constant", $c_1$ and $c_2$ are called "acceleration constants", $\phi_1$ and $\phi_2$ are random numbers in the range $0 \le \phi_1, \phi_2 \le 1$; $x_{i,pbest}(k)$ is called the "personal optimum" for $x_i$ until the $k^{th}$ iteration which produces the minimum value of the objective function J among $x_i(1)$, $x_i(2)$, ... $x_i(k)$; $x_{gbest}(k)$ is called the "global optimum" until the $k^{th}$ iteration which produces the minimum value of the objective function J among all the "personal optimum" $x_{1,pbest}(k)$, $x_{2,pbest}(k)$, ... $x_{N,pbest}(k)$. The velocity $v_i(k+1)$ in Equation (40) and Equation (41) drives the optimization process and reflects the socially exchanged information. For each update of the position of each particle in Equation (40), the feasibility of the updated position $x_i(k+1)$ needs to be checked based on Equation (39); if Equation (39) is not met for $x_i(k+1)$, then the value of the objective function J for $x_i(k+1)$ is set as $J=+\infty$.

In some embodiments, a performance measure function err is adopted to evaluate the solution of the PSO $$err = \rho_1 \|\bar{x}_{pbest}(k) - x_{gbest}(k)\| + \rho_2 |\Delta J_{min}(k)| + \rho_3 \|\Delta x_{gbest}(k)\| \quad (42)$$

where k=2, 3, ... iter; $\rho_1$, $\rho_2$, and $\rho_3$ are weighting factors to satisfy different design requirements; $\bar{x}_{pbest}(k)$ means the average of all the "personal optimum" $x_{1,pbest}(k)$, $x_{2,pbest}(k)$, ... $x_{N,pbest}(k)$ at the $k^{th}$ iteration in Equation (41), i.e., $$\bar{x}_{pbest}(k) = \frac{1}{N} \sum_{i=1}^{N} x_{i,pbest}(k) \quad (43)$$

$x_{gbest}(k)$ is the "global optimum" as in Equation (41); $\Delta J_{min}(k)$ is the difference between the minimum of the objective function J for all the particles at the $k^{th}$ iteration, named $J_{min}(k)$, and at the $(k-1)^{th}$ iteration, named $J_{min}(k-1)$, i.e., $\Delta J_{min}(k) = J_{min}(k) - J_{min}(k-1)$; $\Delta x_{gbest}(k)$ is the difference between the "global optimum" at the $k^{th}$ iteration $x_{gbest}(k)$ and at the $(k-1)^{th}$ iteration $x_{gbest}(k-1)$, i.e., $\Delta x_{gbest}(k) = x_{gbest}(k) - x_{gbest}(k-1)$. In addition, $\|\cdot\|$ means the norm of a vector and $|\cdot|$ means the absolute value of a scalar number. The PSO is implemented by computing Equation (40)-(42) repeatedly until the maximum iteration iter, or a sufficiently good value of the objective function J, or a sufficiently good value of the performance measure function err, is achieved. The finial value of the "global optimum", called $x_{gbest}$, is regarded as the optimal solution of the problem, i.e., the order number $N_p$ of the optimal switching sequence 1640 and the corresponding duty cycle $T_{01}$ 1650 in Equation (32) minimizing the objective function J.

Figure 19:
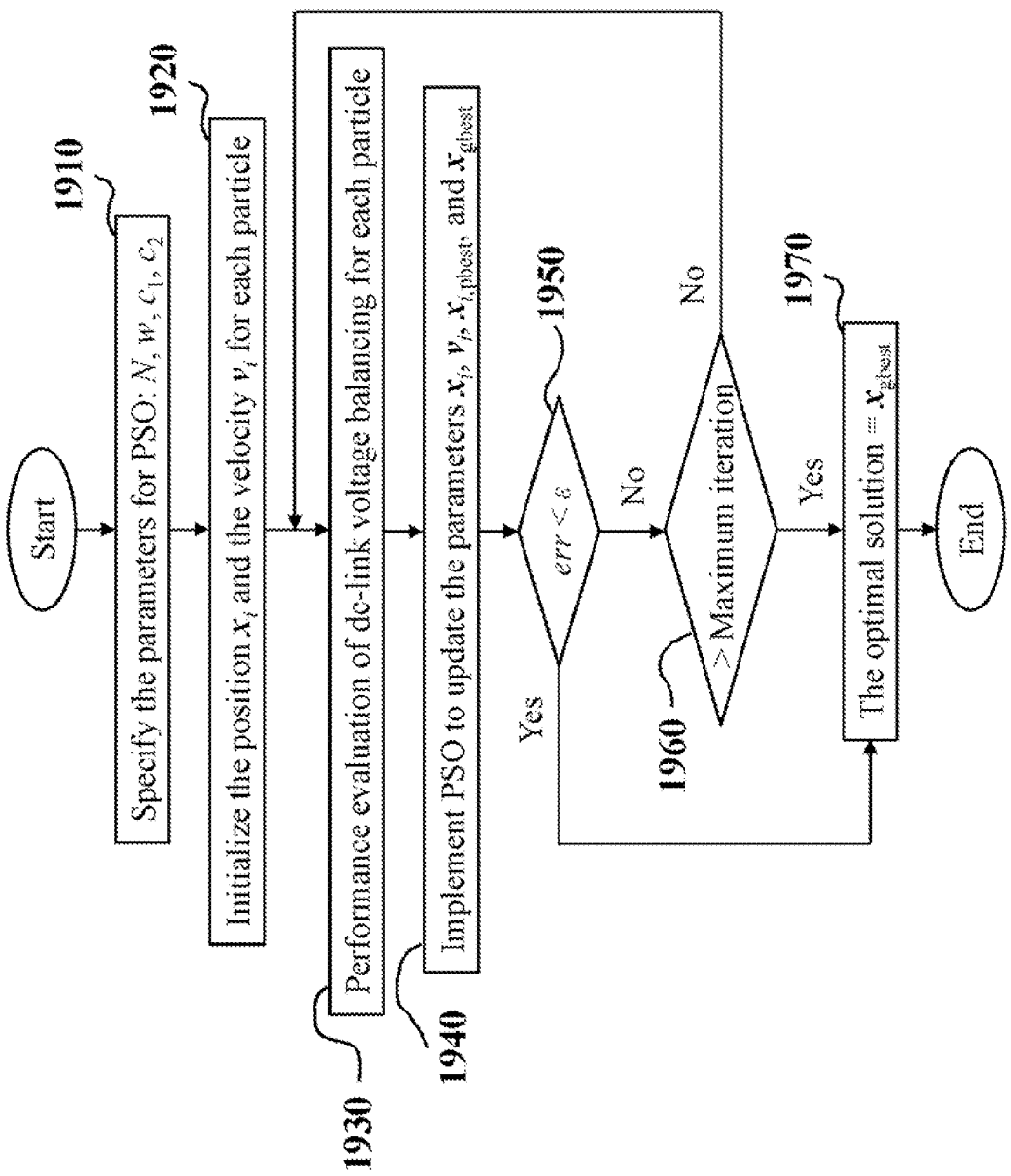
FIG. 19 is a flow chart of particle swarm optimization according to some embodiments of the invention.

The flow chart of PSO in some embodiments is shown in FIG. 19. 1910 specifies the parameters in Equation (38); 1920 initializes the "position" and "velocity" for each particle in Equation (38) and Equation (40)-(41); 1930 evaluates the performance of the particles, i.e., the corresponding value of the objective function J for each particle; 1940 updates the "position", "velocity", and "personal optimum" for each particle and the "global optimum" based on Equation (40) and Equation (41); 1950 compares the performance measure function err in Equation (42) with a selected tolerance $\epsilon$ of error, e.g., $\epsilon = 10^{-6}$; 1960 examines whether the iteration reaches the maximum iter; 1970 produces the optimal solution $x_{gbest}$ of the problem. Based on $x_{gbest}$, the optimal switching sequence 1640 and the corresponding duty cycle $T_{01}$ 1650 in Equation (32) are obtained.

Figure 20A:
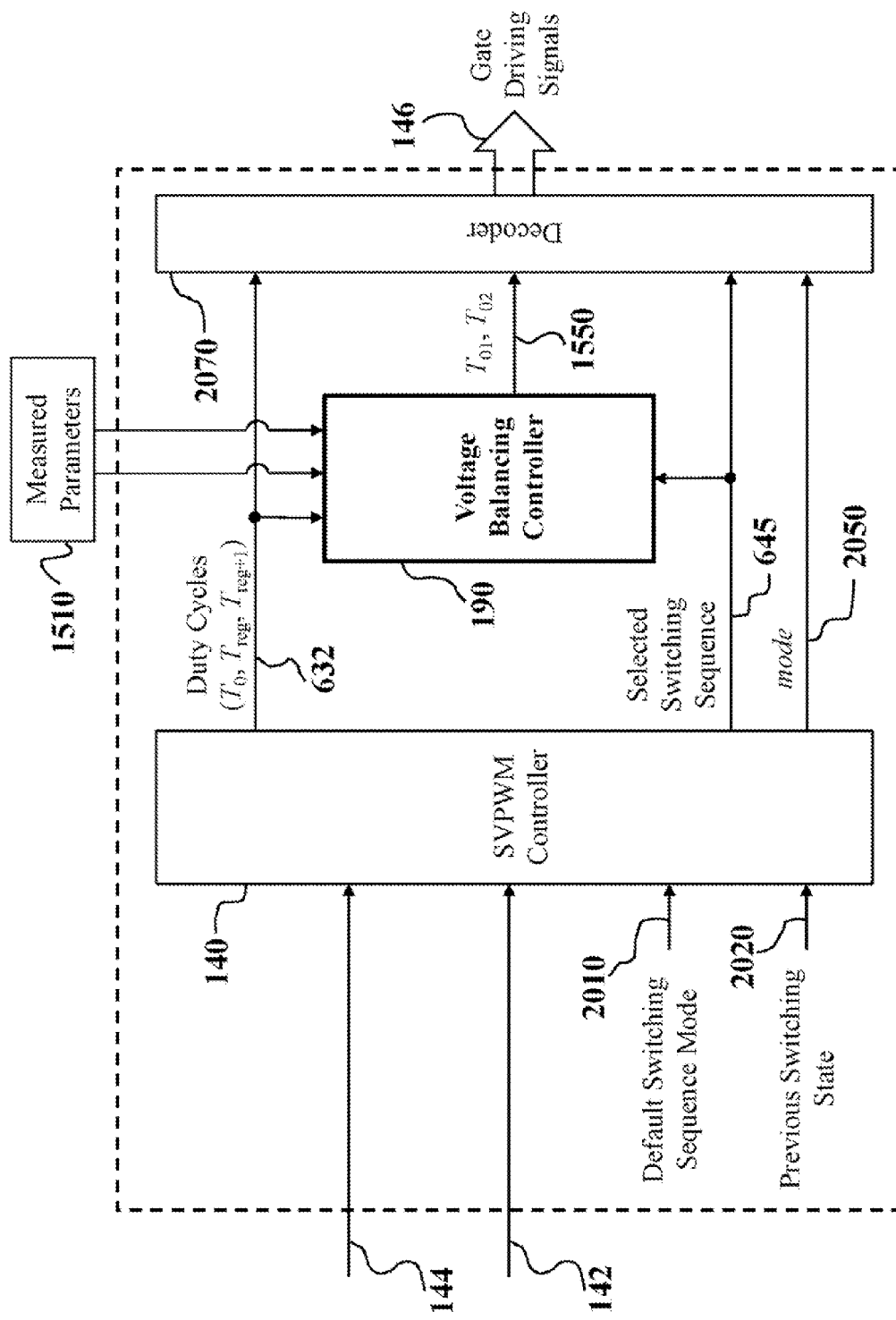
FIG. 20A-B are example block diagrams of a controller of a multilevel inverter according to some embodiments of the invention.

FIG. 20A shows a block diagram of the controller 180 according to one embodiment of the invention. The SVPWM controller 140 produces the duty cycles 632, i.e., the values of $T_0$, $T_{reg}$, and $T_{reg+1}$ in Equation (19) and Equation (20), a selected switching sequence 645, and the corresponding switching sequence mode mode 2050 according to the command reference voltage 142, the command switching frequency 144, the default switching sequence mode d_mode 2010, and the previous switching state 2020, i.e., the switching state of the inverter 120 at the end of last switching cycle.

Assume the previous switching state 2020 is $S_{ap}S_{bp}S_{cp}$, where $S_{ap}$, $S_{bp}$, and $S_{cp}$ are the switching states of phase A, B, and C of the inverter 120, respectively, then the first switching state of the selected switching sequence 645, i.e., $S_{a01}S_{b01}S_{c01}$ 1100 in FIG. 11C or $S_{a02}S_{b02}S_{c02}$ 1110 in FIG. 11D, is selected from all the switching states at the first vertex 244 of the modulation triangle, e.g., 142 374 and 031 372 as shown in FIG. 3B, so as to minimize the following function $\Delta S$ $$\Delta S = |S_a - S_{ap}| + |S_b - S_{bp}| + |S_c - S_{cp}| \quad (44)$$

where $S_a$, $S_b$, and $S_c$ are the switching states of phase A, B, and C of the inverter 120, respectively. The purpose of minimizing $\Delta S$ in Equation (44) is to reduce the harmonics and voltage surges during the switching transient, i.e., the switching transient from previous switching state $S_{ap}S_{bp}S_{cp}$ to $S_{a01}S_{b01}S_{c01}$ 600 or $S_{a02}S_{b02}S_{c02}$ 610. According to the second mapping shown in FIG. 5A, the corresponding switching sequence mode mode 2050 is determined by the default switching sequence mode d_mode 2010 and the first switching state of the selected switching sequence 645. For example, if the default switching sequence mode 2010 is d_mode=1 and the first switching state of the selected switching sequence 645 obtained from Equation (44) is not the bottom one of the switching states at the first vertex 244 of the modulation triangle, i.e., not 031 372 as shown in FIG. 3B, then the corresponding switching sequence mode 2050 is mode=1 and the switching sequence is shown in FIG. 5B as 510 and shown in FIG. 11C. On the contrary, if the default switching sequence mode 2010 is d_mode=1 and the first switching state of the selected switching sequence 645 obtained from Equation (44) is the bottom one of the switching states at the first vertex 244 of the modulation triangle, i.e., 031 372 as shown in FIG. 3B, then the corresponding switching sequence mode 2050 is mode=2 and the switching sequence is shown in FIG. 5B as 520 and shown in FIG. 11D.

According to the measured parameters 1510, i.e., the voltages of the DC-link capacitors 112, 114, 116, and 119 on sensing lines 150, the signals on lines 160 from current sensors 170 which sense the output currents of the inverter 120 on the output lines 123, and the signals on line 165 from current sensor 175 which senses the output current of the DC source 110 on the input lines 111, the voltage balancing controller 190 generates the optimal duty cycle of the zero vector 1550 as in FIG. 15. Finally, the selected switching sequence 645, the duty cycles 632, the optimal duty cycle of the zero vector 1550, and the switching sequence mode 2050 are decoded by a decoder 2070 according to FIG. 2C and sent to the inverter 120 as gate driving signals 146.

Figure 20B:
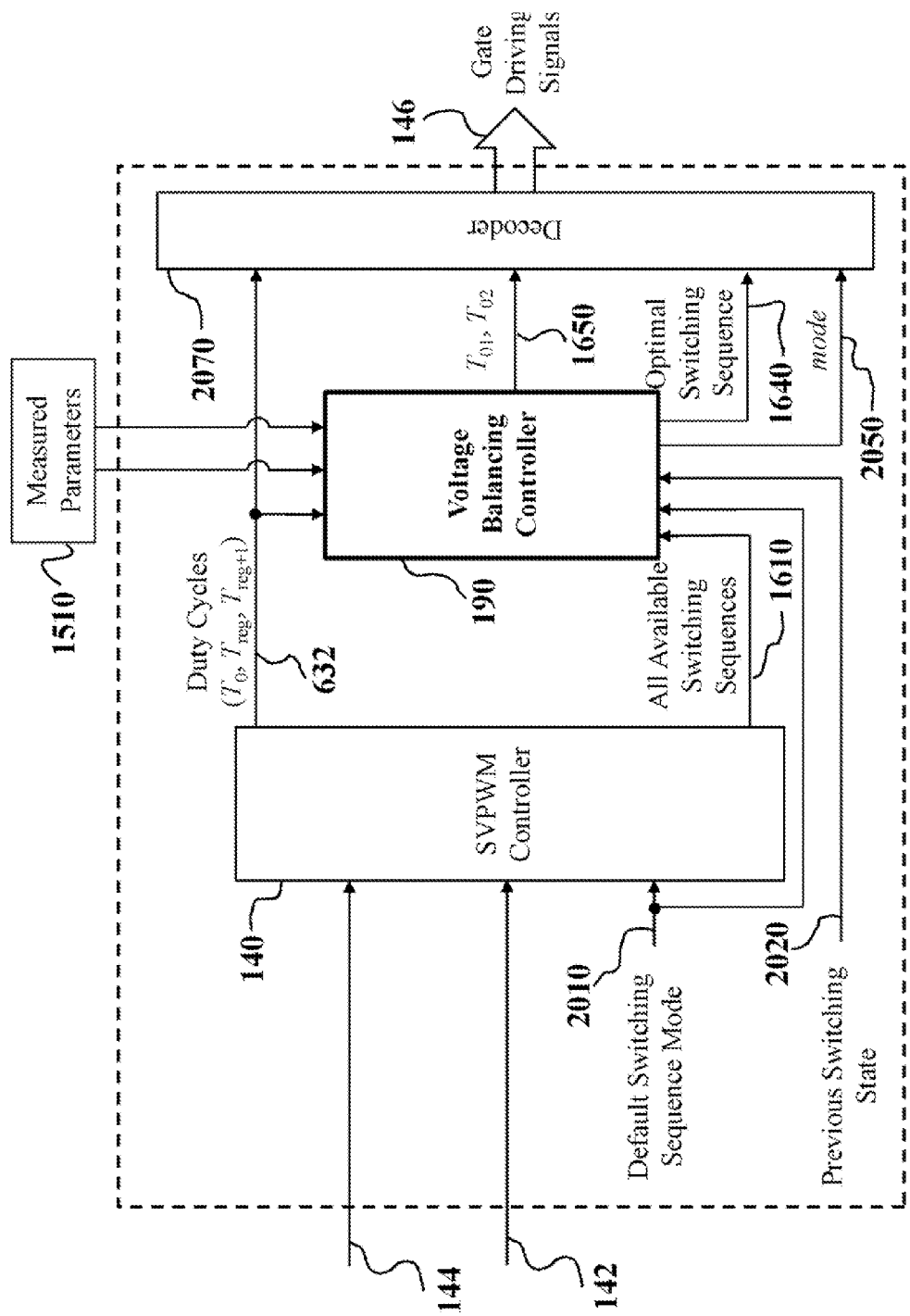

FIG. 20B shows a block diagram of the controller 180 according to another embodiment of the invention. Unlike just producing one selected switching sequence 645 as in FIG. 20A, the SVPWM controller 140 in FIG. 20B produces all available switching sequences 1610, i.e., the set of switching sequences 1610, for the command reference voltage 142 according to the default switching sequence mode d_mode 2010. For example, if the command reference voltage is in low-modulation region as 1210 shown in FIG. 12A, then all the available switching sequences for the command reference voltage 1210 will be generated by the SVPWM controller 140 as 1250 when the default switching sequence mode 2010 is d_mode=1 or as 1260 when the default switching sequence mode 2010 is d_mode=2, based on the second mapping shown in FIG. 5A. According to the duty cycles 632 generated by the SVPWM controller 140, the set of switching sequences 1610, and the measured parameters 1510, the voltage balancing controller 190 generates the optimal switching sequence 1640 and the corresponding optimal duty cycle of zero vector 1650 as in FIG. 16.

Based on the optimal switching sequence 1640, the previous switching state 2020, and the default switching sequence mode d_mode 2010, the voltage balancing controller 190 will determine whether to change the default switching sequence mode 2010, which will reverse the switching sequence, so that the first switching state of the optimal switching sequence 1640 makes the function ΔS in Equation (44) smaller. For example, if the default switching sequence mode 2010 is d_mode=1 and the optimal switching sequence 1640 is 022→023→123→133 in 1250 in FIG. 12B, then the switching sequence mode 2050 is mode=1 when the function ΔS in Equation (44) is smaller for 022 1270 than for 133 1280, and the switching sequence mode 2050 is mode=2 when the function ΔS in Equation (44) is smaller for 133 1280 than for 022 1270, in which case the switching sequence is shown in FIG. 12B as 133→123→023→022 in 1260 and shown in FIG. 11D. Finally, the optimal switching sequence 1640, the duty cycles 632, the optimal duty cycle of the zero vector 1650, and the switching sequence mode 2050 are decoded according to FIG. 2C and sent to the inverter 120 as gate driving signals 146.

Generally, if there are only two switching states at the first vertex of the modulation triangle, e.g., 244 in FIG. 2B and FIG. 3A, then the two block diagrams of the controller 180 in FIG. 20A and FIG. 20B in the present invention are actually equivalent to each other; if there are more than two switching states at the first vertex of the modulation triangle, e.g. 253 in FIG. 2B and FIG. 9A, then the calculation speed of the block diagram in FIG. 20A is faster than the calculation speed of the block diagram in FIG. 20B, but the control effect of the block diagram in FIG. 20A for DC-link voltage balancing is not as good as the control effect of the block diagram in FIG. 20B. There is a tradeoff between the calculation speed and the control effect according to application requirements.

It is understood that all the measured parameters 1510, i.e., the voltage signals of the DC-link capacitors 112, 114, 116, and 119 on sensing lines 150, the output current signal of the DC source 110 on line 165, and the output current signals of the inverter 120 on lines 160, in the present invention are instantaneous values, so the DC-link voltage balancing control method in the present invention is suitable for any load without any assumption on the output current waveforms.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for balancing a voltage of an inverter, comprising steps for:
   determining an expected voltage of a capacitor for a switching cycle;
   determining a duty cycle minimizing a value of an objective function representing a difference between the expected voltage of the capacitor and a desired voltage of the capacitor, wherein the objective function is differential, further comprising:
   minimizing the objective function to produce the duty cycle corresponding to a zero value of a derivative of the objective function; and
   selecting, based on the duty cycle, a switching sequence controlling the inverter during the switching cycle, wherein the steps of the method are performed by a processor.

2. The method of claim 1, further comprising:
   measuring the voltage $v_k$ of the capacitor $C_k$ at beginning $t_0$ of the switching cycle;
   determining the expected voltage $v'_k$ of the capacitor $C_k$ based on the voltage $v_k$; and
   determining the duty cycle based on the expected voltage $v'_k$.

3. The method of claim 2, wherein the expected voltage $v'_k$ is determined according to $$v'_k = v_k + \bar{i}_{c(k)} \cdot T_s / C_k,$$

where $i_{c(k)}$ is an instantaneous current of the capacitor $C_k$, and $\bar{i}_{c(k)}$ is an average current $i_{c(k)}$ of the capacitor $C_k$ during the switching cycle $T_s$ as $$\bar{i}_{c(k)} = \frac{1}{T_s} \int_{t_0}^{t_0+T_s} i_{c(k)} dt.$$

4. The method of claim 3, further comprising:
   measuring an output current of the inverter;
   measuring an output current of a DC source; and
   determining an average current of the capacitor based on the output current of the inverter, the output current of the DC source and the switching sequence.

5. The method of claim 1, further comprising:
   determining a set of switching sequences based on a reference voltage;
   minimizing the objective function for each switching sequence in the set of switching sequences; and
   selecting the switching sequence and the duty cycle corresponding to a minimal value of the objective function.

6. The method of claim 1, wherein the objective function J is $$J = \sum_{k=1}^{n-1} \sigma_k \left( v'_k - \frac{v_{dc}}{n-1} \right)^2,$$

wherein $\sigma_k > 0$, $k=1, 2, \ldots n-1$, is a weighting factor, $V_{dc}$ is a voltage of a DC source, n is a level of the inverter, $v'_k$ is the expected voltage of the capacitor determined for the switching sequence, and wherein the derivative is $$\frac{dJ_1}{dT_{01}} = \sum_{k=1}^{n-1} 2\sigma_k \left( v'_k - \frac{v_{dc}}{n-1} \right) \frac{dv'_k}{dT_{01}} = \sum_{k=1}^{n-1} 2\sigma_k \left( v'_k - \frac{v_{dc}}{n-1} \right) \alpha_{1(k)} =$$

$$\sum_{k=1}^{n-1} 2\sigma_k \left( \alpha_{1(k)} \cdot T_{01} + \alpha_{2(k)} - \frac{v_{dc}}{n-1} \right) \alpha_{1(k)} = 0,$$

and the duty cycle $T_{opt}$ is $$T_{opt} = -\frac{\sum_{k=1}^{n-1} \sigma_k \left( a_{2(k)} - \frac{v_{dc}}{n-1} \right) \alpha_{1(k)}}{\sum_{k=1}^{n-1} \sigma_k a_{1(k)}^2},$$

wherein and $\alpha_{1(k)}$ and $\alpha_{2(k)}$ are constants, and $T_{01}$ is the duty cycle of a first zero vector.

7. The method of claim 1, further comprising:
   minimizing the objective function based on a particle swarm optimization.

8. The method of claim 1, wherein the objective function is selected from a group consisting of $J_1$, $J_2$, and $J_3$ function determined according to $$\begin{cases} J_1 = \sum_{k=1}^{n-1} \sigma_k \left(v'_k - \frac{V_{dc}}{n-1}\right)^2, \\ J_2 = \sum_{k=1}^{n-1} \sigma_k \left|v'_k - \frac{V_{dc}}{n-1}\right|, \text{ and} \\ J_3 = \max_{k=1,2,\ldots n-1} \left\{\sigma_k \left|v'_k - \frac{V_{dc}}{n-1}\right|\right\}, \end{cases}$$

wherein $\sigma_k > 0$, $k=1, 2, \ldots n-1$, is a weighting factor, $V_{dc}$ is a voltage of a DC source, n is a level of the inverter, $v'_k$ is the expected voltage of the capacitor determined for the switching sequence.

9. The method of claim 1, wherein the desired voltage of the capacitor is a nominal voltage of the capacitor.

10. A method for a DC-link voltage balancing of a multilevel inverter based on an objective function of a duty cycle representing a difference between a desired voltage of a capacitor and an expected voltage of the capacitor, comprising:
   determining a set of switching sequences based on a reference voltage;
   minimizing, for each switching sequence in a set of switching sequence, the objective function to produce a set of duty cycles; and
   selecting the switching sequence and the duty cycle corresponding to a minimal value of the objective function.

11. The method of claim 10, further comprising:
   measuring the voltage $v_k$ of the capacitor $C_k$ at the beginning $t_0$ of the switching cycle;
   determining the expected voltage $v'_k$ of the capacitor $C_k$ at the end of the switching cycle based on the voltage $v_k$; and
   determining the duty cycle based on the expected voltage $v'_k$.

12. The method of claim 11, wherein the expected voltage $v'_k$ is determined according to $$v'_k = v_k + \bar{i}_{c(k)} \cdot T_s / C_k,$$

where $i_{c(k)}$ is an instantaneous current of the capacitor $C_k$, and $\bar{i}_{c(k)}$ is an average current $i_{c(k)}$ of the capacitor $C_k$ during the switching cycle $T_s$ as $$\bar{i}_{c(k)} = \frac{1}{T_s} \int_{t_0}^{t_0+T_s} i_{c(k)} dt.$$

13. The method of claim 12, further comprising:
   measuring an output current of the inverter;
   measuring an output current of a DC source; and
   determining the average current of the capacitor based on the output current of the inverter, the output current of the DC source and a switching sequence.

14. The method of claim 10, wherein the objective function is differential, further comprising:
   minimizing the objective function based on a derivative value of the objective function.

15. The method of claim 10, further comprising:
   minimizing the objective function based on a particle swarm optimization.

16. A voltage balancing controller, comprising:
   a processor determining a duty cycle minimizing an objective function representing a difference between an expected and a desired voltage of a capacitor, and controlling an inverter based on a switching sequence corresponding to the duty cycle, wherein the processor determines, based on a reference voltage, a set of switching sequences and a corresponding set of duty cycles, and selecting the switching sequence and the duty cycle resulting in a minimal value of the objective function.

17. A voltage balancing controller, comprising:
   a processor determining a duty cycle minimizing an objective function representing a difference between an expected and a desired voltage of a capacitor, and controlling an inverter based on a switching sequence corresponding to the duty cycle, wherein the processor minimizes the objective function based on a derivative of the objective function or a particle swarm optimization.

* * * * *